(12) United States Patent
Abotabl et al.

(10) Patent No.: US 12,348,462 B2
(45) Date of Patent: Jul. 1, 2025

(54) NETWORK INDICATION OF FULL-DUPLEX CAPABILITY

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/744,435

(22) Filed: May 13, 2022

(65) Prior Publication Data

US 2023/0370240 A1 Nov. 16, 2023

(51) Int. Cl.
*H04L 5/14* (2006.01)
*H04W 48/10* (2009.01)
*H04W 74/0833* (2024.01)

(52) U.S. Cl.
CPC ............ *H04L 5/14* (2013.01); *H04W 48/10* (2013.01); *H04W 74/0833* (2013.01)

(58) Field of Classification Search
CPC ....... H04L 5/14; H04L 5/0048; H04L 5/0053; H04L 5/0094; H04L 5/001; H04W 48/10; H04W 74/0833; H04W 72/23
See application file for complete search history.

(56) References Cited

U.S. PATENT DOCUMENTS

| | | | |
|---|---|---|---|
| 2016/0323088 A1* | 11/2016 | Beale | H04W 48/10 |
| 2020/0281026 A1* | 9/2020 | Yan | H04L 5/0053 |
| 2021/0336759 A1 | 10/2021 | Abdelghaffar et al. | |
| 2022/0061098 A1* | 2/2022 | Choi | H04L 5/0053 |
| 2023/0247471 A1* | 8/2023 | Zhang | H04L 5/16 370/329 |

OTHER PUBLICATIONS

International Search Report and Written Opinion—PCT/US2023/021171—ISA/EPO—Sep. 6, 2023.

* cited by examiner

*Primary Examiner* — Rina C Pancholi
(74) *Attorney, Agent, or Firm* — QUALCOMM Incorporated

(57) ABSTRACT

Methods, systems, and devices for wireless communications are described. Some wireless communications systems may support a network indication of full-duplex capabilities. For example, a user equipment (UE) may receive, from a network entity, a capability message indicating that the network entity supports one or more modes of a full-duplex communications scheme. The capability message may be associated with an access procedure between the UE and the network entity and the UE may perform the access procedure with the network entity. The UE may communicate with the network entity based on the access procedure and the network entity supporting the one or more modes associated with the full-duplex communications scheme.

29 Claims, 16 Drawing Sheets

NETWORK INDICATION OF FULL-DUPLEX CAPABILITY

FIELD OF TECHNOLOGY

The following relates to wireless communications, including a network indication of full-duplex capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). In some wireless communications systems, the one or more network entities may support a full-duplex communications scheme.

SUMMARY

The described techniques relate to improved methods, systems, devices, and apparatuses that support a network indication of full-duplex capability. Generally, the techniques described herein provide for a user equipment (UE) to receive an indication of full-duplex capabilities of a network entity. For example, the UE may receive, from the network entity, a capability message indicating that the network entity supports one or more modes of a full-duplex communications scheme. The one or more modes may include a non-overlapping sub-band full-duplex mode, a partially-overlapping sub-band full-duplex mode, a fully-overlapping sub-band full-duplex mode, or any combination thereof. In some aspects, the capability message may be associated with an access procedure between the UE and the network entity, such that the UE may perform the access procedure with the network entity and establish communications based on one or more full-duplex modes supported by the network entity. For instance, the UE may communicate with the network entity based on the access procedure and the network entity supporting the one or more modes associated with the full-duplex communications scheme.

In some cases, the capability message may include a system information message, where the system information message indicates that the network entity supports the one or more modes of the full-duplex communications scheme. In some other cases, the capability message may include a downlink message or a control message associated with a random access procedure, where the downlink message or the control message indicates that the network entity supports the one or more modes of the full-duplex communications scheme. In some other cases, the capability message may include a control message associated with a handover procedure, where the control message indicates that the network entity supports the one or more modes of the full-duplex communications scheme.

A method for wireless communications at a UE is described. The method may include receiving, from a network entity, a capability message indicating that the network entity supports one or more modes of a full-duplex communications scheme, where the capability message is associated with an access procedure between the UE and the network entity, performing the access procedure with the network entity, and communicating with the network entity based on the access procedure and the network entity supporting the one or more modes associated with the full-duplex communications scheme.

An apparatus for wireless communications at a UE is described. The apparatus may include a processor, memory coupled with the processor, and instructions stored in the memory. The instructions may be executable by the processor to cause the apparatus to receive, from a network entity, a capability message indicating that the network entity supports one or more modes of a full-duplex communications scheme, where the capability message is associated with an access procedure between the UE and the network entity, perform the access procedure with the network entity, and communicate with the network entity based on the access procedure and the network entity supporting the one or more modes associated with the full-duplex communications scheme.

Another apparatus for wireless communications at a UE is described. The apparatus may include means for receiving, from a network entity, a capability message indicating that the network entity supports one or more modes of a full-duplex communications scheme, where the capability message is associated with an access procedure between the UE and the network entity, means for performing the access procedure with the network entity, and means for communicating with the network entity based on the access procedure and the network entity supporting the one or more modes associated with the full-duplex communications scheme.

A non-transitory computer-readable medium storing code for wireless communications at a UE is described. The code may include instructions executable by a processor to receive, from a network entity, a capability message indicating that the network entity supports one or more modes of a full-duplex communications scheme, where the capability message is associated with an access procedure between the UE and the network entity, perform the access procedure with the network entity, and communicate with the network entity based on the access procedure and the network entity supporting the one or more modes associated with the full-duplex communications scheme.

In some examples of the method, apparatuses, and non-transitory computer-readable medium described herein, receiving the capability message may include operations, features, means, or instructions for receiving a system information message indicating that the network entity supports the one or more modes of the full-duplex communications scheme, the capability message including the system information message.

In some examples of the method, apparatuses, and non-transitory computer-readable medium described herein, the system information message includes one or more bits indicating that the network entity supports the one or more modes of the full-duplex communications scheme.

Some examples of the method, apparatuses, and non-transitory computer-readable medium described herein may further include operations, features, means, or instructions for decoding the system information message, where one or more portions of system information may be encoded with an indication that the network entity supports the one or more modes of the full-duplex communications scheme.

In some examples of the method, apparatuses, and non-transitory computer-readable medium described herein, the system information message indicates one or more parameters associated with a common serving cell configuration, the one or more parameters indicating that the network entity supports the one or more modes of the full-duplex communications scheme.

In some examples of the method, apparatuses, and non-transitory computer-readable medium described herein, the system information message includes one or more fields of a common uplink/downlink configuration, the one or more fields indicating that the network entity supports the one or more modes of the full-duplex communications scheme.

In some examples of the method, apparatuses, and non-transitory computer-readable medium described herein, the system information message includes an indication of an initial bandwidth part, the indication of the initial bandwidth part indicating that the network entity supports the one or more modes of the full-duplex communications scheme.

In some examples of the method, apparatuses, and non-transitory computer-readable medium described herein, the system information message includes one or more bits indicating that the network entity supports the one or more modes of the full-duplex communications scheme, the system information message associated with a system information block (SIB) for cell reselection.

In some examples of the method, apparatuses, and non-transitory computer-readable medium described herein, the system information message includes a master information block (MIB) or a SIB.

In some examples of the method, apparatuses, and non-transitory computer-readable medium described herein, receiving the capability message may include operations, features, means, or instructions for receiving, as part of a random access procedure, a downlink message indicating that the network entity supports the one or more modes of the full-duplex communications scheme, where the capability message includes the downlink message and the access procedure includes the random access procedure.

In some examples of the method, apparatuses, and non-transitory computer-readable medium described herein, the downlink message includes one or more reserved bits indicating that the network entity supports the one or more modes of the full-duplex communications scheme.

In some examples of the method, apparatuses, and non-transitory computer-readable medium described herein, receiving the downlink message may include operations, features, means, or instructions for transmitting, as part of the random access procedure, a first message including a random access request and receiving, in response to the random access request, the downlink message including a random access preamble identifier (RAPID), where a value of the RAPID indicates that the network entity supports the one or more modes of the full-duplex communications scheme.

In some examples of the method, apparatuses, and non-transitory computer-readable medium described herein, each mode of the one or more modes may be associated with one or more RAPIDs.

In some examples of the method, apparatuses, and non-transitory computer-readable medium described herein, receiving the capability message may include operations, features, means, or instructions for receiving, as part of a random access procedure, a control message that schedules a downlink message associated with a random access procedure, where one or more bits of the control message indicate that the network entity supports the one or more modes of the full-duplex communications scheme, the control message including the capability message.

In some examples of the method, apparatuses, and non-transitory computer-readable medium described herein, receiving the capability message may include operations, features, means, or instructions for receiving a control message associated with a handover procedure, where the control message indicates that one or more other network entities support the one or more modes of the full-duplex communications scheme.

In some examples of the method, apparatuses, and non-transitory computer-readable medium described herein, the one or more modes include a non-overlapping sub-band full-duplex mode, a partially-overlapping sub-band full-duplex mode, a fully-overlapping sub-band full-duplex mode, or any combination thereof.

In some examples of the method, apparatuses, and non-transitory computer-readable medium described herein, the capability message indicates that the network entity supports the partially-overlapping sub-band full-duplex mode and the method, apparatuses, and non-transitory computer-readable medium may include further operations, features, means, or instructions for determining that the network entity supports the non-overlapping sub-band full-duplex mode and the partially-overlapping sub-band full-duplex mode based on the network entity supporting the partially-overlapping sub-band full-duplex mode.

In some examples of the method, apparatuses, and non-transitory computer-readable medium described herein, the capability message indicates that the network entity supports the fully-overlapping sub-band full-duplex mode and the method, apparatuses, and non-transitory computer-readable medium may include further operations, features, means, or instructions for determining that the network entity supports the non-overlapping sub-band full-duplex mode, the partially-overlapping sub-band full-duplex mode, and the fully-overlapping sub-band full-duplex mode based on the network entity supporting the fully-overlapping sub-band full-duplex mode.

Some examples of the method, apparatuses, and non-transitory computer-readable medium described herein may further include operations, features, means, or instructions for transmitting a message indicating a capability of the UE to support the one or more modes associated with the full-duplex communications scheme, where the message may be transmitted in response to the capability message.

A method for wireless communications at a network entity is described. The method may include transmitting a capability message indicating that the network entity supports one or more modes of a full-duplex communications scheme, where the capability message is associated with an access procedure between the network entity and a UE, performing the access procedure with the UE, and communicating with the UE based on the access procedure and the network entity supporting the one or more modes associated with the full-duplex communications scheme.

An apparatus for wireless communications at a network entity is described. The apparatus may include a processor, memory coupled with the processor, and instructions stored in the memory. The instructions may be executable by the processor to cause the apparatus to transmit a capability message indicating that the network entity supports one or more modes of a full-duplex communications scheme, where the capability message is associated with an access procedure between the network entity and a UE, perform the access procedure with the UE, and communicate with the UE based on the access procedure and the network entity supporting the one or more modes associated with the full-duplex communications scheme.

Another apparatus for wireless communications at a network entity is described. The apparatus may include means for transmitting a capability message indicating that the network entity supports one or more modes of a full-duplex communications scheme, where the capability message is associated with an access procedure between the network entity and a UE, means for performing the access procedure with the UE, and means for communicating with the UE based on the access procedure and the network entity supporting the one or more modes associated with the full-duplex communications scheme.

A non-transitory computer-readable medium storing code for wireless communications at a network entity is described. The code may include instructions executable by a processor to transmit a capability message indicating that the network entity supports one or more modes of a full-duplex communications scheme, where the capability message is associated with an access procedure between the network entity and a UE, perform the access procedure with the UE, and communicate with the UE based on the access procedure and the network entity supporting the one or more modes associated with the full-duplex communications scheme.

In some examples of the method, apparatuses, and non-transitory computer-readable medium described herein, transmitting the capability message may include operations, features, means, or instructions for broadcasting, to one or more UEs including the UE, a system information message indicating that the network entity supports the one or more modes of the full-duplex communications scheme, the capability message including the system information message.

In some examples of the method, apparatuses, and non-transitory computer-readable medium described herein, the system information message includes one or more bits indicating that the network entity supports the one or more modes of the full-duplex communications scheme.

Some examples of the method, apparatuses, and non-transitory computer-readable medium described herein may further include operations, features, means, or instructions for encoding one or more portions of system information with an indication that the network entity supports the one or more modes of the full-duplex communications scheme, where the system information message includes the one or more portions of the system information encoded with the indication.

In some examples of the method, apparatuses, and non-transitory computer-readable medium described herein, the system information message indicates one or more parameters associated with a common serving cell configuration, the one or more parameters indicating that the network entity supports the one or more modes of the full-duplex communications scheme.

In some examples of the method, apparatuses, and non-transitory computer-readable medium described herein, the system information message includes one or more fields of a common uplink/downlink configuration, the one or more fields indicating that the network entity supports the one or more modes of the full-duplex communications scheme.

In some examples of the method, apparatuses, and non-transitory computer-readable medium described herein, the system information message includes an indication of an initial bandwidth part, the indication of the initial bandwidth part indicating that the network entity supports the one or more modes of the full-duplex communications scheme.

In some examples of the method, apparatuses, and non-transitory computer-readable medium described herein, the system information message includes one or more bits indicating that the network entity supports the one or more modes of the full-duplex communications scheme, the system information message associated with a SIB for cell reselection.

In some examples of the method, apparatuses, and non-transitory computer-readable medium described herein, transmitting the capability message may include operations, features, means, or instructions for transmitting, as part of a random access procedure, a downlink message indicating that the network entity supports the one or more modes of the full-duplex communications scheme, where the capability message includes the downlink message and the access procedure includes the random access procedure.

In some examples of the method, apparatuses, and non-transitory computer-readable medium described herein, the downlink message includes one or more reserved bits indicating that the network entity supports the one or more modes of the full-duplex communications scheme.

In some examples of the method, apparatuses, and non-transitory computer-readable medium described herein, transmitting the downlink message may include operations, features, means, or instructions for receiving, as part of the random access procedure, a first message including a random access request and transmitting, in response to the random access request, the downlink message including a RAPID, where a value of the RAPID indicates that the network entity supports the one or more modes of the full-duplex communications scheme.

In some examples of the method, apparatuses, and non-transitory computer-readable medium described herein, each mode of the one or more modes may be associated with one or more RAPIDs.

In some examples of the method, apparatuses, and non-transitory computer-readable medium described herein, transmitting the capability message may include operations, features, means, or instructions for transmitting, as part of a random access procedure, a control message that schedules a downlink message associated with the random access procedure, where one or more bits of the control message indicate that the network entity supports the one or more modes of the full-duplex communications scheme.

In some examples of the method, apparatuses, and non-transitory computer-readable medium described herein, transmitting the capability message may include operations, features, means, or instructions for transmitting a control message associated with a handover procedure, where the control message indicates that one or more other network entities support the one or more modes of the full-duplex communications scheme.

In some examples of the method, apparatuses, and non-transitory computer-readable medium described herein, the one or more modes include a non-overlapping sub-band full-duplex mode, a partially-overlapping sub-band full-duplex mode, a fully-overlapping sub-band full-duplex mode, or any combination thereof.

Some examples of the method, apparatuses, and non-transitory computer-readable medium described herein may further include operations, features, means, or instructions for receiving a message indicating a capability of the UE to support the one or more modes associated with the full-duplex communications scheme, the one or more modes including a non-overlapping sub-band full-duplex mode, a partially-overlapping sub-band full-duplex mode, a fully-overlapping sub-band full-duplex mode, or any combination thereof, where the message may be received in response to the capability message.

In some examples of the method, apparatuses, and non-transitory computer-readable medium described herein, the message indicates that the UE supports the partially-overlapping sub-band full-duplex mode and the method, apparatuses, and non-transitory computer-readable medium may include further operations, features, means, or instructions for determining that the UE supports the non-overlapping sub-band full-duplex mode and the partially-overlapping sub-band full-duplex mode based on the UE supporting the partially-overlapping sub-band full-duplex mode.

In some examples of the method, apparatuses, and non-transitory computer-readable medium described herein, the capability message indicates that the UE supports the fully-overlapping sub-band full-duplex mode and the method, apparatuses, and non-transitory computer-readable medium may include further operations, features, means, or instructions for determining that the UE supports the non-overlapping sub-band full-duplex mode, the partially-overlapping sub-band full-duplex mode, and the fully-overlapping sub-band full-duplex mode based on the UE supporting the fully-overlapping sub-band full-duplex mode.

DETAILED DESCRIPTION

Figure 1:
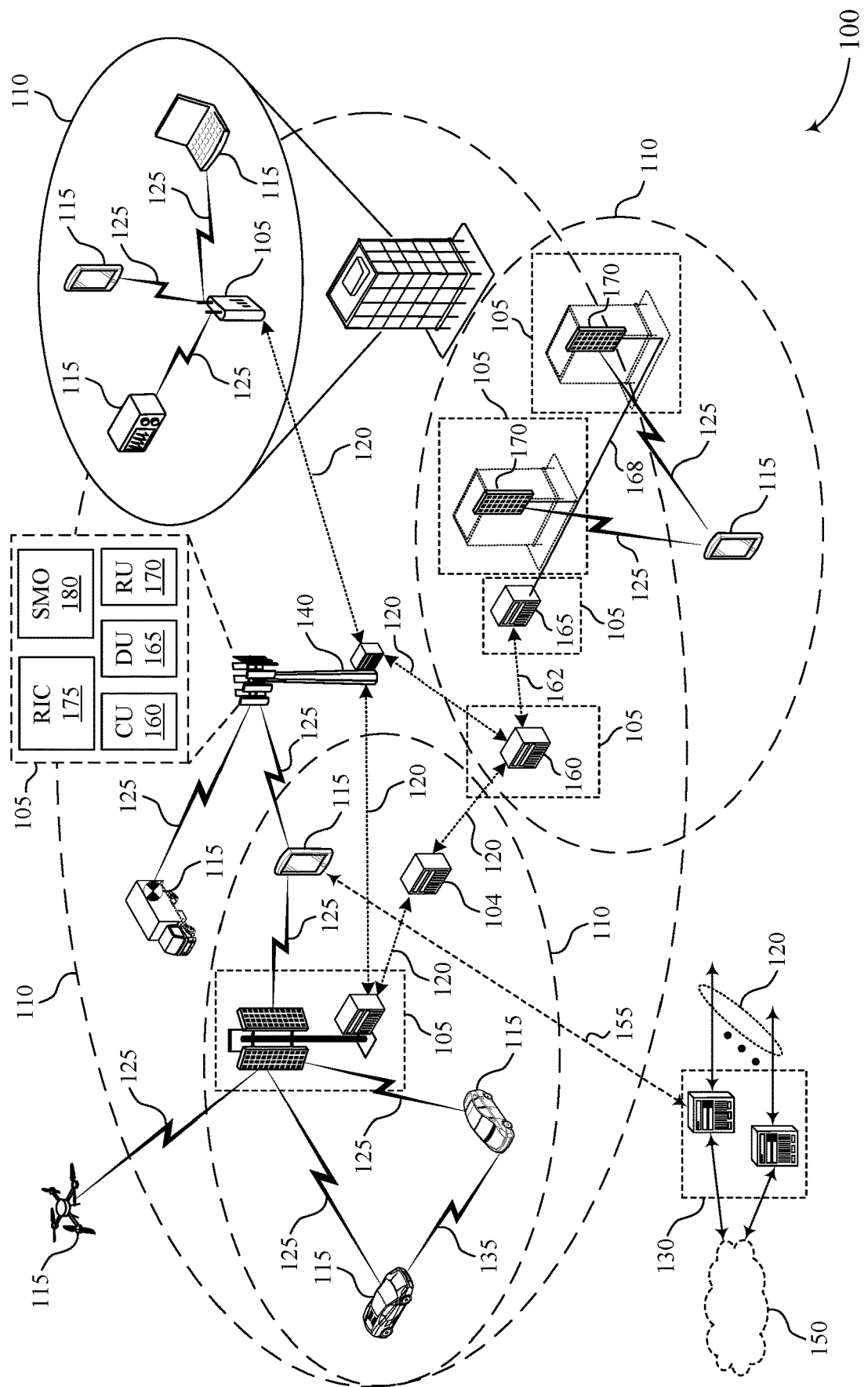
FIGS. 1, 2A, 2B, and 2C each illustrate an example of a wireless communications system that supports a network indication of full-duplex capability in accordance with one or more aspects of the present disclosure.

In some wireless communications systems, a communication device, such as a user equipment (UE) or a network entity, may support wireless communications over one or multiple radio access technologies. Examples of radio access technologies may include fourth generation (4G) systems, such as Long Term Evolution (LTE) systems, and fifth generation (5G) systems, which may be referred to as NR systems. In such cases, the communication device may operate in a half-duplex mode or a full-duplex mode, or a combination thereof. In a full-duplex mode, the communication device may simultaneously transmit and receive communications during the time period. That is, communications received by the communication device may overlap in the time domain with communications transmitted by the communication device. For example, symbols occupied by received signals may overlap with symbols occupied by transmitted signals.

In some examples, neighboring communication devices (e.g., UEs, network entities, or the like) may perform full-duplex communications or half-duplex time division duplexing (TDD) concurrently, which may result in cross-link interference (CLI) due to communications from the neighboring devices overlapping in time. Additionally, or alternatively, communication devices may experience self-interference due to multiple communications from the communication device overlapping in time. In some cases, to reduce interference, a communication device, such as a UE, may employ one or more interference mitigation techniques for communications with a network entity, in which the one or more mitigation techniques may be based on capabilities of the network entity to communicate using a full-duplex communications scheme. However, in some cases, the UE may be unaware of the capabilities of the network entity to support the full-duplex communications scheme and may be unable to employ the one or more interference mitigation techniques (e.g., unable to set the proper hardware configuration) and, as such, may experience interference when communicating with the network entity. Additionally, or alternatively, the UE may be unaware of the capabilities of the network entity to support the full-duplex communications scheme and may not know how or whether to indicate, to the network entity, capabilities of the UE to support the full-duplex communications scheme, such as when entering a connected state.

As such, techniques described herein may provide for a UE to receive an indication of full-duplex capabilities of a network entity (e.g., via a capability message). For example, the UE may receive, from a network entity, a message (e.g., a capability message) indicating that the network entity supports one or more modes of a full-duplex communications scheme. The one or more modes may include a non-overlapping sub-band full-duplex mode, a partially-overlapping sub-band full-duplex mode, a fully-overlapping sub-band full-duplex mode, or any combination thereof. Additionally, the capability message indicating that the network entity supports the one or more modes of a full-duplex communications scheme may be associated with an access procedure. As such, the UE may perform an access procedure with the network entity and may communicate with the network entity based on the access procedure and the network entity supporting the one or more modes associated with the full-duplex communications scheme.

In some cases, the network entity may indicate the one or more modes supported by the network entity via a system information message, which may include one or more system information blocks (SIBs) or master information blocks (MIBs), or any combination thereof. For example, the network entity may indicate the one or more modes via one or more bits of the system information message, via one or more parameters associated with a common serving cell configuration included in the system information message, via one or more fields of a common uplink/downlink configuration included in the system information message, via an indication of an initial bandwidth part included in the system information message, via one or more bit associated with a SIB for cell reselection, or any combination thereof. In some other cases, the network entity may indicate the one or more modes supported by the network entity via a message associated with the access procedure (e.g., a random access procedure). For example, the network entity may indicate the one or more modes via a downlink message associated with the random access procedure or via a control message scheduling the downlink message associated with the random access procedure. In some other cases, the network entity may indicate the one or more modes supported by other network entities via a control message associated with a handover procedure.

Aspects of the disclosure are initially described in the context of wireless communications systems. Aspects of the disclosure are then described in the context of full-duplex communications schemes and process flows. Aspects of the disclosure are further illustrated by and described with reference to apparatus diagrams, system diagrams, and flowcharts that relate to network indication of full-duplex capability.

FIG. 1 illustrates an example of a wireless communications system 100 that supports a network indication of full-duplex capability in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a network indication of full-duplex capability as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 attempting to access a wireless network may perform an initial cell search by detecting a primary synchronization signal (PSS) from a network entity 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. In some examples, the PSS and the SSS may be located in the central 62 and 72 subcarriers of a carrier, respectively. In some cases, a network entity 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal SSBs on respective directional beams, where one or more SSBs may be included within a burst.

After receiving the PSS and SSS, the UE 115 may receive a MIB, which may be transmitted in the PBCH. The MIB may contain system bandwidth information, an SFN, and a physical HARQ indicator channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, physical uplink shared channel (PUSCH), power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame, and the MIB may use the middle 6 RBs (72 subcarriers) in the frequency domain. The MIB carries a few important pieces of information for UE initial access, including: downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code. After reading a MIB (either a new version or a copy), the UE 115 may try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE 115 may receive one or more Ms. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 may also include cell selection information (or cell selection parameters). Additionally, SIB1 may include scheduling information for other SIBs. SIB2 may be scheduled dynamically according to information in SIB1, and includes access information and parameters related to common and shared channels. The periodicity of SIB2 can be set to, for example, 8, 16, 32, 64, 128, 256 or 512 radio frames.

After the UE 115 decodes SIB2, it may transmit a RACH preamble to a network entity 105. For example, the RACH preamble may be randomly selected from a set of 64 predetermined sequences. This may enable the network entity 105 to distinguish between multiple UEs 115 trying to access the system simultaneously. The network entity 105 may respond with a random access response that provides an uplink resource grant, a timing advance, and a temporary C-RNTI. The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The network entity 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In the wireless communications system 100, the UEs 115 and the network entities 105 may support a network indication of full-duplex capabilities. For example, a network entity 105 may transmit, to a UE 115, an indication (e.g., in a capability message) that the network entity 105 supports one or more modes of a full-duplex communications scheme. The one or more modes may include a first full-duplex mode associated with an uplink/downlink non-overlapping sub-band configuration (e.g., mode), a second full-duplex mode associated an uplink/downlink non-overlapping sub-band configuration, and a third full-duplex mode associated with an uplink./downlink fully overlapping sub-band configuration. In some cases, the network entity 105 may indicate the one or more modes supported by the network entity 105 via system information, such as one or more SIBs or MIBs. In some other cases, the network entity 105 may indicate the one or more modes supported by the network entity via one or more messages associated with an access procedure, such as a random access channel (RACH) procedure. In some other cases, the network entity 105 may indicate the one or more modes supported by the network entity via a message associated with a handover procedure (e.g., a handover command). The UE 115 may receive the capability message including the indication that the network entity 105 supports one or more modes of a full-duplex communications scheme and may perform an access procedure with the network entity 105. Additionally, the UE 115 may communicate with the network entity 105 based on the access procedure and the one or more modes supported by the network entity 105.

Figure 2A:
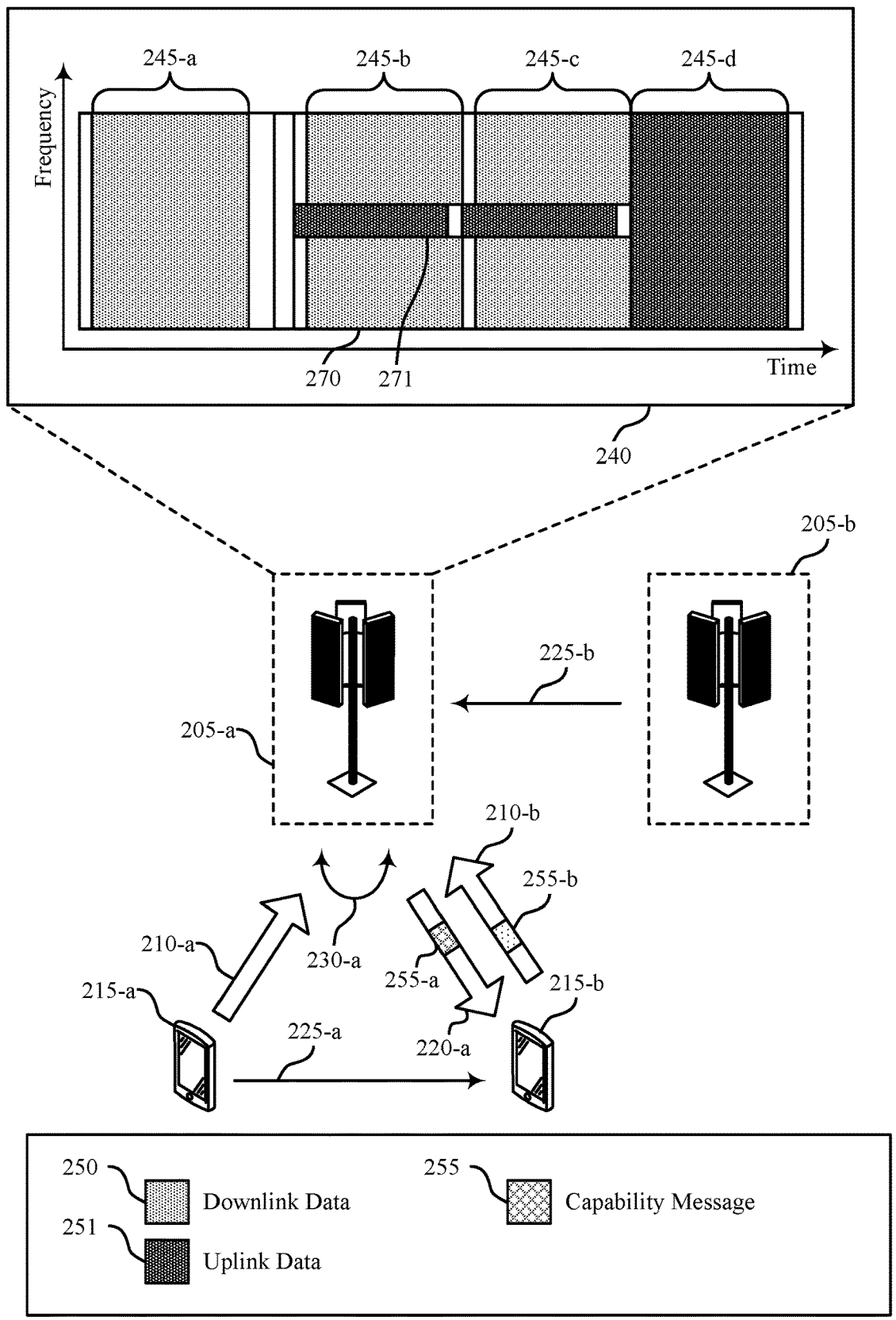
Figure 2B:
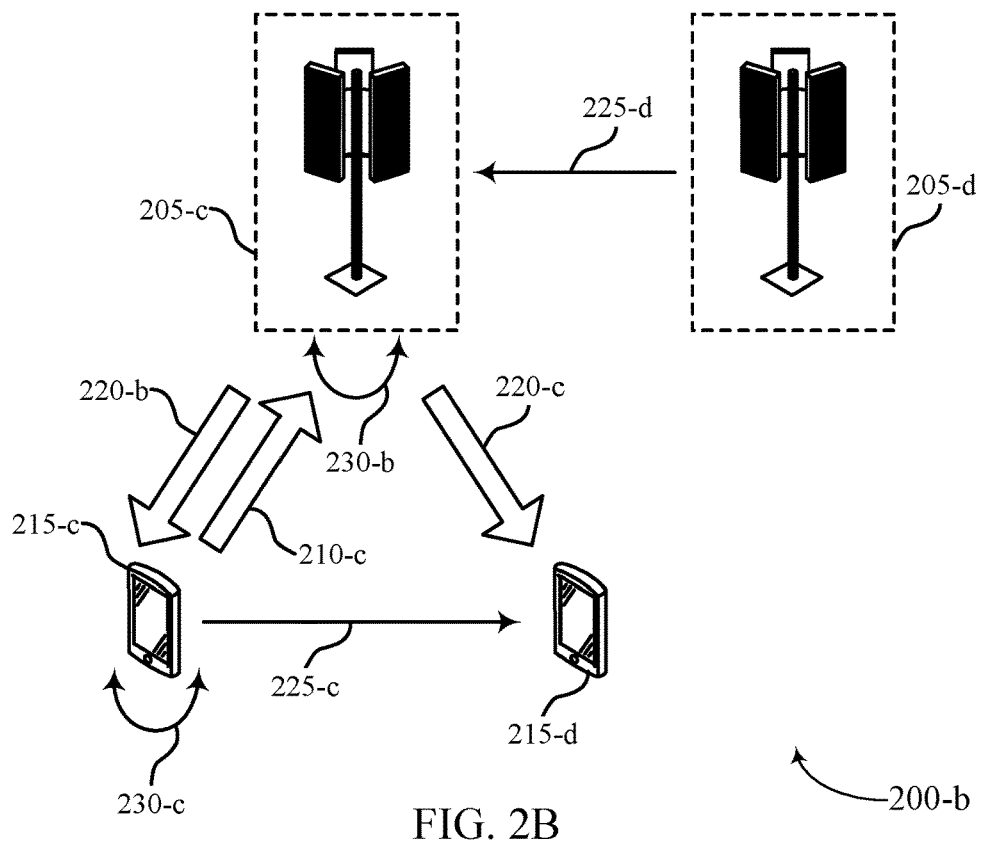
Figure 2C:
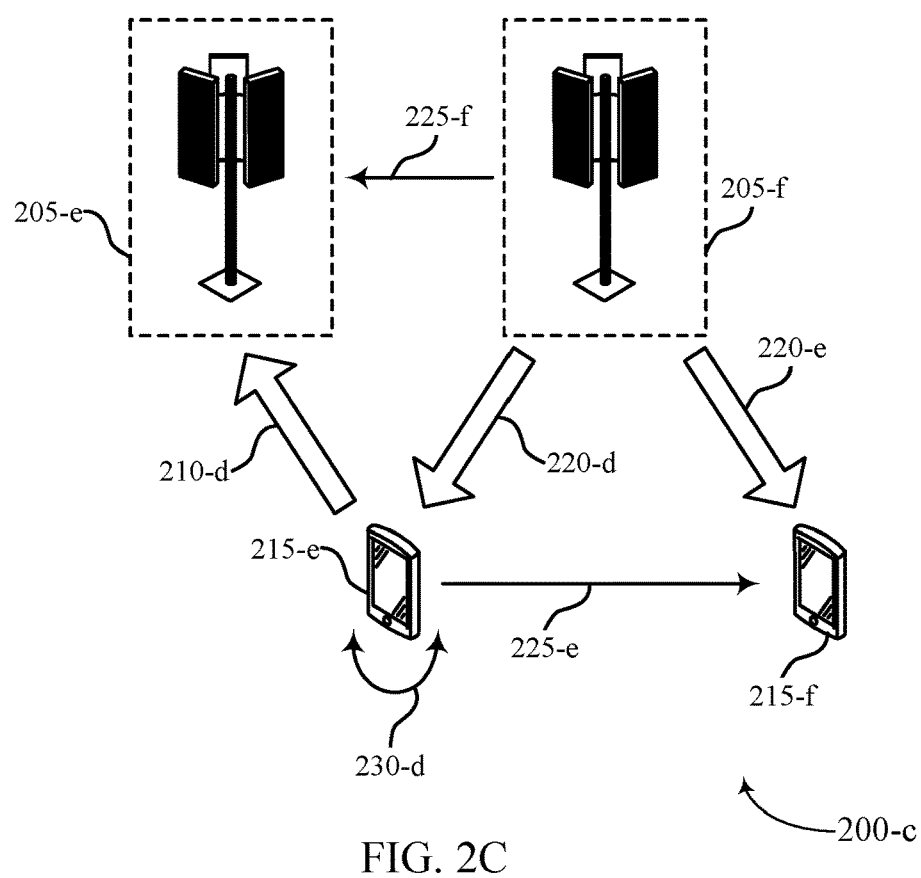

FIGS. 2A, 2B, and 2C each illustrate an example of a wireless communications system 200 that supports a network indication of full-duplex capability in accordance with one or more aspects of the present disclosure. In some examples, the wireless communications systems 200 (e.g., a wireless communications system 200-a, a wireless communications system 200-b, and a wireless communications system 200-c) may implement aspects of the wireless communications system 100. For example, the wireless communications systems 200 may each include one or more network entities 205 (e.g., a network entity 205-a, a network entity 205-b, a network entity 205-c, a network entity 205-d, a network entity 205-e, and a network entity 205-f) and one or more UEs 215 (e.g., a UE 215-a, a UE 215-b, a UE 215-c, a UE 215-d, a UE 215-e, and a UE 215-f), which may be examples of the corresponding devices described with reference to FIG. 1. In the example of FIGS. 2A, 2B, and 2C, the network entities 205 may be examples of a CU 160, a DU 165, an RU 170, a base station 140, an IAB node 104, or one or more other network nodes as described with reference to FIG. 1. The wireless communications systems 200 may include techniques for the network entities 205 to provide an indication of full-duplex capability to one or more UEs 215.

In the examples of FIGS. 2A, 2B, and 2C, the UEs 215 and the network entities 205 may communicate via one or more communication links 210 (e.g., a communication link 210-a, a communication link 210-b, a communication link 210-c, and a communication link 210-d) and via one or more communication links 220 (e.g., a communication link 220-a, a communication link 220-b, a communication link 220-c, a communication link 220-d, and a communication link 220-e). The communication links 210 may be examples of uplinks and the communication links 220 may be examples of downlinks. Additionally, or alternatively, the communication links 210 and the communication links 220 may each be examples of a communication link 125 as described with reference to FIG. 1. Each wireless communications system 200 may illustrate communication devices (e.g., one or more UEs 215, one or more network entities 205) operating in a full-duplex mode (e.g., performing full-duplex wireless communications) or a half-duplex TDD mode (e.g., performing half-duplex TDD wireless communications). That is, full-duplex (or half-duplex TDD) capabilities may be present at one or more network entities 205, one or more UEs 215 (or both). For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 205 (and/or one or more UEs 215), half-duplex communications at one or more UE 215, or any combination thereof.

Each wireless communications system 200 may support multiple types of full-duplex operations. For example, a communication device operating within the wireless communications systems 200 (e.g., a network entity 205, a UE 215) may support in-band full-duplex (IBFD) operations, sub-band FDD (SBFD) operations (e.g., frequency duplex operations), or both. In some examples of IBFD operations, the communication device may transmit and receive wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap (e.g., a partially-overlapping sub-band full-duplex mode or a fully-overlapping sub-band full-duplex mode). Additionally, or alternatively, for SBFD operations, the communications device may transmit and receive communications at over a same time resource and one or more different frequency resources. That is, the downlink resources may be separated from the uplink resource in the frequency domain (e.g., a non-overlapping sub-band full-duplex mode).

In the example of FIG. 2A, the network entity 205-a may support SBFD operations (e.g., a non-overlapping sub-band full-duplex mode), such that downlink communications transmitted by the network entity 205-a (e.g., to the UE 215-b) may overlap in time with uplink communications received by the network entity 205-a (e.g., from the UE 215-a). In some examples, the network entity 205-a may configure communications for the UE 215-a and the UE 215-b according to the resource structure 240. The resource structure 240 may include time domain resources (e.g., slots, symbols) allocated for downlink data 250 (e.g., a time domain resource 245-a), time domain resources allocated for uplink data 251 (e.g., a time domain resource 245-d), and one or more time domain resources allocated for both downlink data 250 and uplink data 251 (e.g., a time domain resource 245-b and a time domain resource 245-c).

In some examples, the time domain resources allocated for both downlink data 250 and uplink data 251 (e.g., the time domain resource 245-b and the time domain resource 245-c) may be referred to as D+U slots (or D+U symbols). In some examples, a D+U slot may include half-duplex symbols (e.g., downlink symbols or uplink symbols) or full-duplex symbols (e.g., both downlink symbols and uplink symbols). For example, the time domain resource 245-b and the time domain resource 245-c (e.g., D+U slots) may be examples of slots, in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for IBFD operations) or adjacent bands (e.g., for SBFD operations).

For SBFD operations in which uplink transmissions and downlink transmissions occur in adjacent bands, a half-duplex communication device may either transmit in an uplink radio frequency band or receive in a downlink radio frequency band. That is, for a given time domain resource (e.g., for a given D+U slot or a given D+U symbol), such as the time domain resource 245-b, the half-duplex device (e.g., the UE 215-a, the UE 215-b) may transmit uplink data 251 (e.g., perform a PUSCH transmission) in the uplink radio frequency band 271 or receive downlink data 250 the downlink radio frequency band 270. For example, the UE 215-a may transmit uplink data 251 in the uplink radio frequency band 271, while the UE 215-b receives downlink data 250 the downlink radio frequency band 270.

Additionally, or alternatively, for SBFD operations in which uplink and downlink transmissions occur in adjacent bands, a full-duplex device may transmit in the uplink radio frequency band and receive in the downlink radio frequency band. That is, for a given time domain resource (e.g., for a given D+U slot or a given D+U symbol), such as the time domain resource 245-b, the full-duplex device may transmit uplink data 251 (e.g., perform a PUSCH transmission) in the uplink radio frequency band 271 and receive downlink data 250 the downlink radio frequency band 270. In the example of FIG. 2B, the UE 215-c (e.g., a full-duplex device) may transmit communications in an uplink radio frequency band, while receiving communications in a downlink radio frequency band (e.g., over a same D+U slot or a same D+U symbol).

In some examples, full-duplex communications may provide for latency reduction. For example, latency savings may be enabled by receiving downlink signal in uplink slots. Moreover, full-duplex communications may provide for spectrum efficiency enhancement (e.g., per cell or per UE 215), efficient resource utilization, and coverage extension, among other benefits. In some examples, however, full-duplex communications may lead to one or more types of interference, such as inter-cell interference (e.g., from neighboring communication devices), self-interference (e.g., for full-duplex communication devices), and CLI (e.g., inter-cell CLI or intra-cell CLI). For example, a communication device (e.g., one or more network entities 205, one or more UEs 215) may experience self-interference 230 (e.g., a self-interference 230-a, a self-interference 230-b, a self-interference 230-c, and a self-interference 230-d) between a pair of beams, such as a beam used for transmitting communications and a beam used die receiving communications. In some examples, self-interference may result from signal leakage between an antenna panel used to transmit communications and an antenna panel used to receive communications.

Additionally, or alternatively, neighboring communication devices (e.g., neighboring UEs 215, neighboring network entities 205) may perform full-duplex communications (or half-duplex TDD) concurrently, such that communications received by a first communication device may overlap in time with communications transmitted by a second communication device (e.g., a neighboring communication device). In such an example, the communications transmitted by the second communication device may interfere with the communications received at the first communication device. For example, the communications transmitted by the second communication device may lead to CLI at the first communications device. In some examples, CLI (e.g., CLI 225-a, CLI 225-b, CLI 225-c, CLI 225-d, CLI 225-e, or CLI 225-f) may result from energy leakage due to timing and frequency unalignment (e.g., misalignment) between the neighboring communication devices.

Additionally or alternatively CLI may result from automatic gain control (AGC) mismatch (e.g., misalignment). For example, as illustrated in the example of FIG. 2A, the AGC of the UE 215-b may be driven (e.g., controlled) by downlink communications from a serving cell (e.g., the network entity 205-a). In such an example, uplink communications transmitted from the UE 215-a may saturate the AGC of the UE 215-b, resulting in a misalignment (e.g., a loss of orthogonality) of the downlink communications received by the UE 215-b and the uplink communications transmitted by the UE 215-a. In some examples, the misalignment of the downlink communications and the uplink communications may lead to CLI 225-a at the UE 215-b.

In some examples, the network entity 205-a may be operating in a full-duplex mode (e.g., SBFD or IBFD) and the UEs 215 (e.g., the UE 215-a and the UE 215-b) may be operating in a half-duplex mode. For example, the network entity 205-a may receive uplink communications from the UE 215-a (e.g., via the communication link 210-a), while simultaneously transmitting downlink communications to a UE 215-b (e.g., via the communication link 220-a). In such an example, the full-duplex communications at the network entity 205-a may lead to self-interference 230-a. Additionally, or alternatively, the network entity 205-a and the network entity 205-b (e.g., neighboring network entities) may concurrently perform full-duplex communications, such that downlink signals transmitted by the network entity 205-b may overlap with uplink signals received by the network entity 205-a, leading to CLI 225-b.

Additionally, or alternatively, the UE 215-a and the UE 215-b (e.g., neighboring UEs) may concurrently perform half-duplex TDD communications such that uplink signals transmitted by the UE 215-b may overlap with downlink signals received by the UE 215-a, which may lead to CLI 225-a. In some examples, the UE 215-a may be operating in a cell different from the cell in which the UE 215-b may be operating. For example, the UE 215-a and the UE 215-b may be operating in adjacent cells. In an example, the CLI 225-a may be an example of inter-cell CLI. Additionally, or alternatively, the network entity 205-b may perform full-duplex communications concurrently with the network entity 205-a. In such an example, downlink communications transmitted by the network entity 205-b may lead to inter-cell interference at the UE 215-b. For example, the downlink communications transmitted by the network entity 205-b (e.g., to another UE (not shown)) may interfere with downlink communications received the UE 215-b (e.g., from the network entity 205-a).

In some other examples, the UE 215-a and the UE 215-b may be operating in a same cell. In such an example, the CLI 225-a may be an example of intra-cell CLI. For example, the network entity 205-a may be operating in a full-duplex mode (e.g., in SBFD), such that the network entity 205-a may configure downlink communications for the UE 215-a in frequency domain resources adjacent to the frequency domain resources allocated for uplink communications from the UE 215-b. For example, the network entity 205-a may configure the UE 215-b to receive downlink data 250 (e.g., from the network entity 205-a) in the time domain resource 245-b and in the downlink radio frequency band 270 and the UE 215-a may be configured to transmit uplink data 251 in the time domain resource 245-b in the uplink radio frequency band 271 (e.g., the adjacent frequency resources). In such an example, the uplink communications transmitted by the UE 215-a may interfere with the downlink communications received at the UE 215-b.

In the example of FIG. 2B, the network entity 205-c and the UE 215-c may each be operating in a full-duplex mode (e.g., IBDF), such that the UE 215-c may receive downlink communications from the network entity 205-c via the communication link 220-b, while simultaneously transmitting uplink communications to the network entity 205-c via the communication link 210-c. In such an example, the full-duplex communications at the network entity 205-c and the full-duplex communications at the UE 215-c may lead to self-interference 230-b and self-interference 230-c, respectively. In some examples of the wireless communications system 200-b, the UE 215-c and the UE 215-d may each be operating in a multiple transmission and reception mode. In such an example, downlink communications and uplink communications performed by the network entity 205-c may occur at two different antenna panels located at two transmission and reception points. For example, the reception of uplink communications from the UE 215-c a may occur at an antenna panel of a first transmission and reception point and the transmission of downlink communications to the UE 215-c may occur at an antenna panel of a second transmission and reception point. In some other examples, reception of the uplink communications and transmission of the downlink communications may occur at two co-located antenna panels of the network entity 205-c (e.g., a single base station).

In the example of FIG. 2C, the UE 215-e may be operating in a full-duplex mode (e.g., SBFD), such that the UE 215-*e* may receive downlink communications from the network entity 205-*f* via the communication link 220-*d*, while simultaneously transmitting uplink communications to the network entity 205-*e* via the communication link 210-*d*. In such an example, the full-duplex communications at the UE 215-*e* may lead to self-interference 230-*d*. In some examples of the wireless communications system 200-*c*, the network entity 205-*e* and the network entity 205-*f* may be examples of transmission and reception points and the UE 215-*e* (e.g., and the UE 215-*f*) may be operating in a multiple transmission and reception mode. In such an example, the uplink communications transmitted from the UE 215-*e* may lead to CLI 225-*e* (e.g., intra-cell CLI) at the UE 215-*f*.

In some examples, to reduce interference within the wireless communications systems 200, the network (e.g., one or more network entities 205) may employ one or more interference mitigation techniques (e.g., sub-band filtering, tightened emission requirements or use of a timing/power control mode). However, a UE 215 may employ the one or more mitigation techniques for communications with a network entity 205 based on capabilities of the network entity 205 to communicate using a full-duplex communications scheme. In some cases, the UE 215 may be unaware of the capabilities of the network entity 205 to support the full-duplex communications scheme and may be unable to employ the one or more interference mitigation techniques (e.g., unable to set the proper hardware configuration) and, as such, may experience interference when communicating with the network entity 205. Additionally, or alternatively, the UE 215 may be unaware of the capabilities of the network entity 205 to support the full-duplex communications scheme and may not know how or whether to indicate, to the network entity 205, capabilities of the UE 215 to support the full-duplex communications scheme, such as when entering a connected state (e.g., if a network entity 205 does not support the full-duplex communications scheme, in particular SBFD or flexible FD, the UE 215 may refrain from reporting the capabilities of the UE 215 to support the full-duplex communications scheme).

Techniques described herein may support a network entity 205 transmitting a capability message 255, such as a capability message 255-*a*, to a UE 215, indicating that the network entity 205 supports one or more modes of a full-duplex communications scheme. For example, a network entity 205 may support a first full-duplex communication mode, a second full-duplex communication mode, a third full-duplex communication mode, or any combination thereof. The first full-duplex communication mode may be associated with an uplink/downlink non-overlapping sub-band configuration. That is, the first full-duplex communication made may be associated with SBFD operations. The second full-duplex communication mode may be associated with an uplink/downlink partially-overlapping configuration. That is, the second full-duplex mode may be associated with IBFD operations, where the IBFD operations are associated with time and frequency resources that partially overlap. The third full-duplex communication mode may be associated with an uplink/downlink fully overlapping configuration. That is, the third full-duplex mode may be associated with IBFD operations, where the IBFD operations are associated with time and frequency resources that fully overlap.

In some cases, the network entity 205 may indicate the one or more modes of the full-duplex communications scheme supported by the network entity 205 via a system information message (e.g., the capability message 255-*a* may include the system information message), such via one or more SIBs (e.g., carried by physical downlink shared channel (PDSCH)) or MIBs (e.g., physical broadcast channel (PBCH)). In some embodiments (e.g., when indicated via a MIB), the network entity 205 may indicate the one or more modes via one or more bits in the system information message (e.g., via an explicit). In some other embodiments, the network entity 205 may jointly encode the indication of the one or more modes with one or pieces of system information included in the system information message (e.g., physical resource block (PRB)-grid-offset or broadcast channel subcarrier spacing (SCS) flag). In some other embodiments (e.g., when indicated via one or more SIBs), the network entity 205 may indicate the one or more modes via one or more parameters associated with a common serving cell configuration (e.g., servingCellConfigCommon) included in the system information message, via one or more fields of a common uplink/downlink configuration (e.g., tddUL-DLConfigurationCommon) included in the system information message, via an indication of an initial bandwidth part (BWP) included in the system information message, or via one or more bits associated with system information for cell reselection (e.g., explicit bit indications in other SIBs for cell reselection).

Additionally, or alternatively, the network entity 205 may indicate the one or more modes of the full-duplex communications scheme supported by the network entity 205 via a message associated with an access procedure (e.g., the capability message 255-*a* may include the message associated with an access procedure), such as a random access procedure (e.g., RACH procedure). In some cases, the network entity 205 may transmit the indication of the one or more modes via a downlink message of the random access procedure. For example, the network entity 205 may transmit the indication via the PDSCH of a second message (e.g., MSG2) or of a fourth message (e.g., MSG4) of a four-step random access procedure (e.g., 4-step RACH procedure). In another example, the network entity 205 may transmit the indication via the second message (e.g., MSGB) of a two-step random access procedure (e.g., 2-step RACH procedure). In some cases, the network entity 205 may transmit the indication via one or more reserved bits (e.g., in the MAC sub-header or in the MAC payload) of the downlink message. In some other cases, the network entity 205 may transmit the indication using a random access preamble identifier (RAPID) in the downlink message. That is, each mode of the one or more modes may be associated with one or more values of a RAPID (e.g., each mode may be associated with a range of RAPIDs). As such, the network entity 205 may receive, from a UE 215, a random access request (e.g., as part of the random access procedure) and may transmit, in response to the random access request, the downlink message including a RAPID, where the value of the RAPID is associated with a mode of the one or more modes supported by the network entity 205.

In another embodiment, the network entity 205 may transmit the indication of the one or more modes via a control message (e.g., downlink control information (DCI)) of the random access procedure. For example, the network entity 205 may transmit the indication via a control message (e.g., payload of DCI format 1_0) that schedules a downlink message (e.g., MSG2 or MSGB) associated with the random access procedure (e.g., 2-step RACH procedure or 4-step RACH procedure). In some cases, the network entity 205 may transmit the indication via one or more reserved bits in the control message (e.g., explicitly). Additionally, the control message may be scrambled with a radio network temporary identifier (RNTI) (scrambled with random access RNTI in a 4-step RACH procedure or with MsgB RNTI in a 2-step RACH procedure).

Additionally, or alternatively, the network entity 205 may indicate the one or more modes of the full-duplex communications scheme supported by the network entity 205 via a control message (e.g., handover command) associated with a handover procedure (e.g., the capability message 255-*a* may include the control message associated with the handover procedure). For example, a UE 215 may handover to a target network entity 205 (e.g., in a connected state). In such cases, a source network entity 205 may indicate, in a control message (e.g., transmitted during the handover procedure), whether the one or more modes of the full-duplex communications scheme are supported by a set of one or more target cells available for handover. In other examples, a network node 205 associated with the target cell may indicate (e.g., in a message associated with the handover procedure) its capability to support the one or more modes of the full-duplex communications scheme. In some examples, the network entity 205 may provide the indication of whether the one or more target cells support the one or more modes of the full-duplex communications scheme before the handover procedure. For instance, the indication of whether a neighboring network entity 205 support the one or more modes of the full-duplex communications scheme may be provided with one or more measurement configurations for measurements to be performed as part of the handover procedure. In such cases, a UE 215 may determine which cells or network nodes support full-duplex communications when performing measurements.

In some cases, the network entity 205 may refrain from transmitting the capability message 255-*a* and the UE 215 may determine that the network entity 205 does not support one or more modes of the full-duplex communications scheme (e.g., does not support the full-duplex communications scheme) based on the network entity 205 refraining from transmitting the indication (e.g., based on not receiving a capability message 255-*a*). That is, if the network entity does not signal an indication of its capability to support one or more full-duplex modes, a UE 215 may assume that the network entity (or a call) does not support the one or more full-duplex modes.

In some cases, a UE 215 may transmit, to a network entity, an indication (e.g., via a capability message 255-*b*) of the capability of the UE 215 to support the one or more mode associated with the full-duplex communications scheme (e.g., based on receiving an indication of the capability of the network entity 205 to support the one or more modes). For example, the UE 215 may transmit the indication via a message associated with a random access procedure (e.g., via a specific RACH sequency/preamble associated with MSG1 of a 4-step RACH procedure, via a payload of MSG3 of the 4-step RACH procedure, or via a payload of MSGA of a 2-step RACH procedure).

Figure 3A:
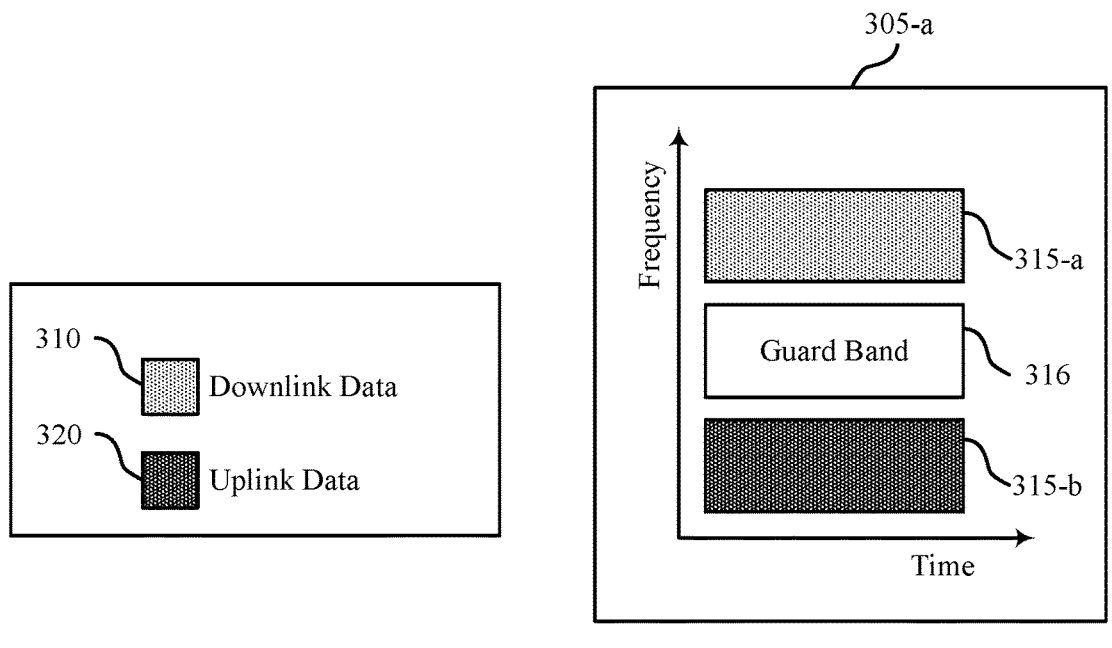
FIGS. 3A and 3B each illustrate an example of a full-duplex communications scheme that supports a network indication of full-duplex capability in accordance with one or more aspects of the present disclosure.
Figure 3B:
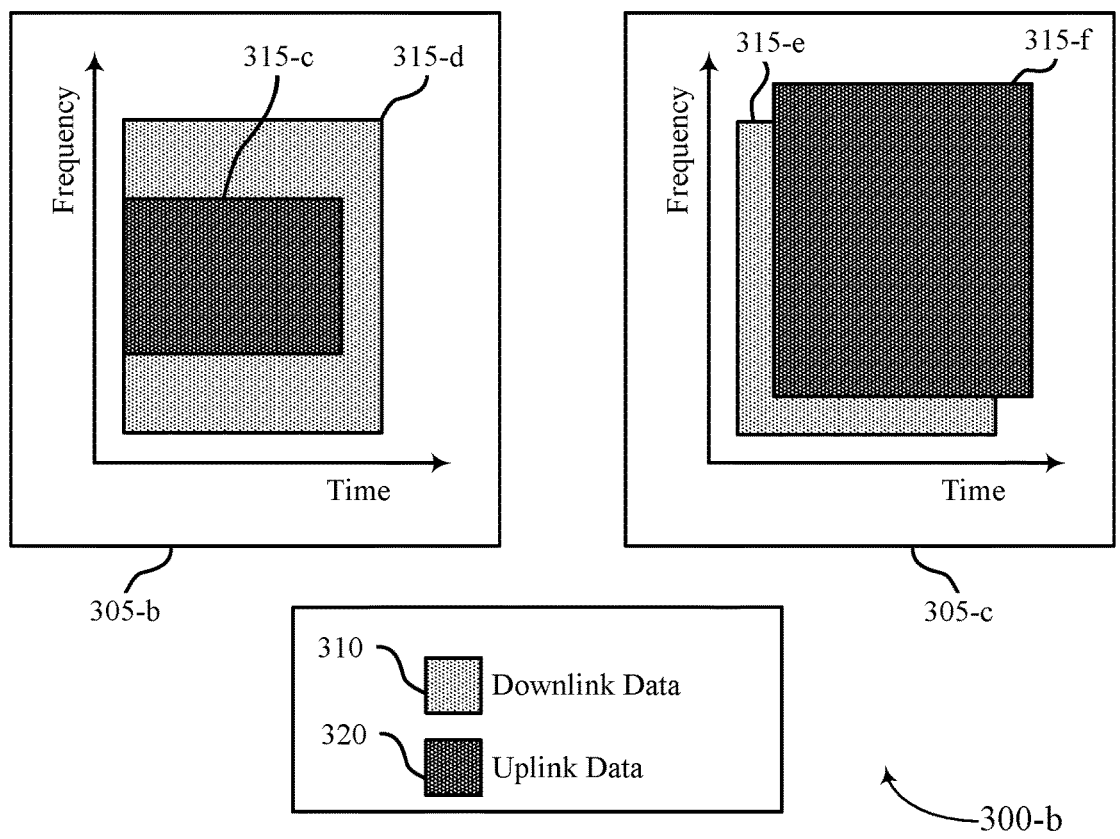

FIGS. 3A and 3B illustrate an example of a full-duplex communications scheme 300-*a* and 300-*b* that supports a network indication of full-duplex capability in accordance with one or more aspects of the present disclosure. In some examples, the full-duplex communications schemes 300 (a full-duplex communications scheme 300-*a* and a full-duplex communications scheme 300-*b*) may implement or be implemented by aspects of the wireless communications system 100 and the wireless communications systems 200. For example, the full-duplex communications schemes 300 may each be implemented by a network entity 105 or a UE 115, which may be examples of the corresponding devices as described with reference to FIG. 1. In some examples of FIGS. 3A and 3B, the network entity 105 may be an example of a CU 160, a DU 165, an RU 170, a base station 140, an IAB node 104, or one or more other network nodes as described with reference to FIG. 1. The full-duplex communications schemes 300 may include techniques for the network entity 105 to provide an indication of full-duplex capability to the UE 115.

In some examples, a wireless communications device (e.g., the network entity 105 or the UE 115) may support full-duplex communications, in which the communication device may transmit and receive communication simultaneously, thereby promoting latency savings enabled by receiving downlink signal in uplink slots (or symbols). In some examples, the communication device may support multiple (e.g., two) types of full-duplex operations. For example, the communication device may support SBFD operations, in which the communication device may transmit and receive communications over a same time resource and on different frequency resources. That is, the downlink resources may be separated from the uplink resource in the frequency domain.

For example, as illustrated by the example of FIG. 3A, the network entity 105 may configure one or more UEs 115 in accordance with the configuration 305-*a* (e.g., for SBFD operations). In such an example, the network entity 105 may configure downlink transmissions (e.g., transmissions of downlink data 310) for the UE 115 in frequency domain resources (e.g., a resource 315-*a*) that may be adjacent to frequency domain resources (e.g., a resource 315-*b*) configured for uplink transmission (e.g., transmissions of uplink data 320) of another UE 115. In some examples, to reduce interference between the uplink transmissions (e.g., scheduled for the resource 315-*a*) and the downlink transmissions (e.g., scheduled for the resource 315-*b*), the network entity 105 may configure the resource 315-*a* and the resource 315-*b* to be separated by a guard band 316.

Additionally, or alternatively, as illustrated in the example of FIG. 3B, the network entity 105 may support IBFD operations, such that the network entity 105 may transmit and receive communications on a same time resource and a same frequency resource (e.g., a same slot and carrier bandwidth). For example, the network entity 105 may configure one or more UEs 115 in accordance with the configuration 305-*b*, the configuration 305-*c*, or both. In such an example, the network entity 105 may configure downlink transmissions (e.g., transmission of the downlink data 310) and the uplink transmissions (e.g., transmission of the uplink data 320), such that the downlink transmission and the uplink transmissions may share a same one or more time and frequency resources (e.g., IBFD time and frequency resources). In some examples, the network entity 105 may configure one or more UEs 115 in accordance with the configuration 305-*b*, such that one or more time and frequency resources allocated for transmission of the uplink data 320 (e.g., a resource 315-*c*) may overlap (e.g., fully overlap) with one or more time and frequency resources allocated for transmission of the downlink data 310 (e.g., a resource 315-*d*). Additionally, or alternatively, the network entity 105 may configure one or more UEs 115 in accordance with the configuration 305-*c*, such that a portion of the one or more time and frequency resources allocated for transmission of the uplink data 320 (e.g., a resource 315-*e*) may overlap with a portion of the one or more time and frequency resources allocated for transmission of the downlink data 310 (e.g., a resource 315-*f*). That is, the resource 315-*e* may partially overlap with the resource 315-*f*.

In some examples, while full-duplex communications may provide for one or more spectrum efficiency enhancements (e.g., per cell or per UE), efficient resource utilization, and coverage area extension, concurrent full-duplex communications may lead to CLI. For example, neighboring communication devices may perform full-duplex communications concurrently, such that communications received by a first communication device may overlap in time with communications transmitted by a second communication device (e.g., a neighboring communication device). In such an example, the communications transmitted by the second communication device may lead to CLI at the first communication device. Additionally, concurrent full-duplex communications at a UE 115 may lead to self-interference. For example, uplink communications transmitted by the UE 115 may overlap in time with downlink communications received by the UE 115 such the uplink communications and downlink communications produce interference with each other. In such cases, the UE 115 may attempt to employ one or more mitigation techniques for communications with a network entity 105. However, the one or more mitigation techniques may be based on the capabilities of the network entity 105 to support the full-duplex communications schemes and the UE 115 may be unaware of the capabilities of the network entity 105. Thus, the UE 115 may be unable to employ the one or more interference mitigation techniques (e.g., unable to set the proper hardware configuration) and, as such, may experience interference when communicating with the network entity 105. Additionally, or alternatively, the UE 115 may not know how or whether to indicate, to the network entity 105, capabilities of the UE 115 to support the full-duplex communications scheme, such as when entering a connected state.

As such, a network entity 105 may transmit, to a UE 115, a capability message indicating that the network entity 105 supports one or more modes of a full duplex communications scheme, in accordance with techniques described herein. In some cases, a communication device, such as a network entity 105 or a UE 115, may support one or more modes of a full duplex communications scheme. For example, a network entity 105 may support a first full-duplex mode (e.g., Mode 1) associated with the configuration 305-a, as illustrated in FIG. 3A, such that the network entity 105 may configure downlink transmissions for a UE 115 in frequency domain resources that may be adjacent to frequency domain resources configured for uplink transmission (e.g., uplink/downlink non-overlapping sub-band mode, SBFD). In another example, the network entity 105 may support a second full-duplex mode (e.g., Mode 2) associated with the configuration 305-c. A network entity 105 that supports a second full-duplex mode may configure uplink and downlink transmissions such that a portion of the one or more time and frequency resources allocated for transmission of uplink data may overlap with a portion of the one or more time and frequency resources allocated for transmission of downlink data (e.g., uplink/downlink partially-overlapping sub-band mode). In another example, the network entity 105 may support a third full-duplex mode (e.g., Mode 3) associated with the configuration 305-b. A network entity 105 that supports a third full-duplex mode may configure uplink and downlink transmissions such that one or more time and frequency resources allocated for transmission of uplink data may overlap (e.g., fully overlap) with one or more time and frequency resources allocated for transmission of downlink data (e.g., uplink./downlink fully overlapping sub-band mode).

In some cases, a network entity 105 may transmit a capability message indicating that the network entity 105 supports the first full-duplex mode, the second full-duplex mode, the third full-duplex mode, or any combination thereof. If the network entity 105 transmits an indication that the network entity 105 supports the third full-duplex mode, the network entity 105 may also support the first full-duplex mode and the second full-duplex mode. For instance, if the network entity 105 indicates (e.g., via a capability message) that it supports fully-overlapping uplink/downlink sub-bands for full-duplex communications, then the UE 115 may assume that the network entity 105 also supports both non-overlapping uplink/downlink sub-bands (e.g., SBFD) and partially-overlapping uplink/downlink sub-bands (e.g., flexible duplex) for full-duplex communications. Additionally, if the network entity 105 transmits an indication that the network entity 105 supports the second full-duplex mode, the network entity 105 may also support the first full-duplex mode. As an example, if the network entity 105 indicates (e.g., via a capability message) that it supports partially-overlapping uplink/downlink sub-bands (e.g., flexible duplex) for full-duplex communications, then the UE 115 may assume that the network entity 105 also supports non-overlapping uplink/downlink sub-bands (e.g., SBFD) for full-duplex communications.

Capability messages transmitted by the UE 115 may also indicate the one or more modes supported by the UE 115. For example, a UE 115 may transmit a capability message indicating that the UE 115 supports the first full-duplex mode, the second full-duplex mode, the third full-duplex mode, or any combination thereof. In some examples, if the UE 115 transmits an indication that the UE 115 supports the third full-duplex mode, the UE 115 may also support the first full-duplex mode and the second full-duplex mode. For instance, if the UE 115 indicates (e.g., via a capability message) that it supports fully-overlapping uplink/downlink sub-bands for full-duplex communications, then the network entity 105 may assume that the UE 115 also supports both non-overlapping uplink/downlink sub-bands (e.g., SBFD) and partially-overlapping uplink/downlink sub-bands (e.g., flexible full-duplex communications) for full-duplex communications. In some aspects, if the UE 115 transmits an indication that the UE 115 supports the second full-duplex mode, the UE 115 may also support the first full-duplex mode. As an example, if the UE 115 indicates (e.g., via a capability message) that it supports partially-overlapping uplink/downlink sub-bands (e.g., flexible full-duplex communications) for full-duplex communications, then the network entity 105 may assume that the UE 115 also supports non-overlapping uplink/downlink sub-bands (e.g., SBFD) for full-duplex communications.

In some cases, the network entity 105 may switch between the one or more of the full-duplex modes based on frequency domain resource allocations for uplink data and downlink data in a frequency domain slot. In such cases, the switching may be based on a full-duplex capability transmitted by the UE 115. As an example, when the UE 115 supports both SBFD and flexible full-duplex communications (e.g., sub-band overlapping), switching between the SBFD and the flexible full-duplex communications may be performed by frequency-domain resource allocations.

Figure 4:
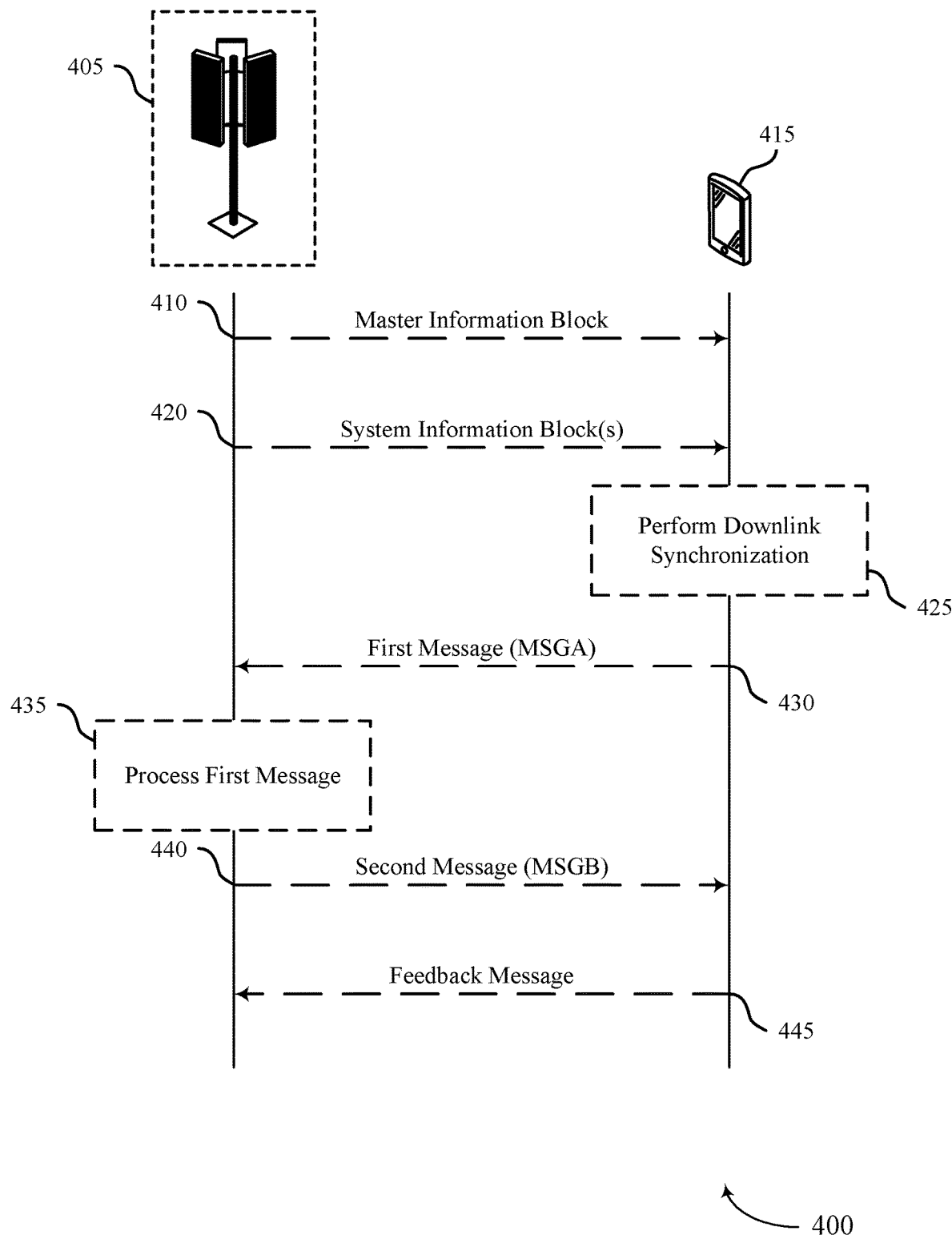
FIGS. 4 and 5 each illustrate an example of a process flow in a system that supports a network indication of full-duplex capability in accordance with one or more aspects of the present disclosure.

FIG. 4 illustrates an example of a process flow 400 in a system that supports a network indication of full-duplex capability in accordance with one or more aspects of the present disclosure. In some examples, the process flow 400 may implement or be implemented by aspects of the wireless communications system 100, the wireless communications systems 200, and the full-duplex communications schemes 300. For example, the process flow 400 may be implemented by a network entity 405 or a UE 415, which may be examples of the corresponding devices as described with reference to FIG. 1. In the example of FIG. 4, the network entity 405 may be an example of a CU 160, a DU 165, an RU 170, a base station 140, an IAB node 104, or one or more other network nodes as described with reference to FIG. 1. The process flow 400 may include techniques for the network entity 405 to provide an indication of full-duplex capability to the UE 415.

In some cases, at 410, the network entity 405 may broadcast one or more MIBs (e.g., system information message). In some cases, a MIB may indicate that the network entity 405 supports one or more modes of a full-duplex communications scheme. For example, the network entity 405 may indicate the one or more modes of a full-duplex communications scheme supported by the network entity 405 via one or more bits in the MIB. In another example, the network entity 405 may encode (e.g., jointly) one or more portions of system information included in the MIB with an indication that the network entity 405 supports the one or more modes of a full-duplex communications scheme (e.g., the UE 415 may decode the system information message to identify the indication).

In some cases, at 420, the network entity may transmit one or more SIBs (e.g., system information messages). In some cases, one or more SIBs may indicate that the network entity 405 supports one or more modes of a full-duplex communications scheme. For example, the network entity 405 may indicate the one or more modes of a full-duplex communications scheme supported by the network entity 405 via one or more parameters associated with a common serving cell configuration, via one or more fields of a common uplink/downlink configuration, via an indication of an initial BWP, or via one or more bits of one or more SIBs associated with cell reselection.

In some cases, at 425, the UE 415 may perform downlink synchronization, which may be based on the system information received from the network entity 405.

In some cases, at 430, the UE 115 may transmit a first message (e.g., MSGA) of a two-step random access procedure (e.g., 2-step RACH procedure), the first message including a random access request. In some cases, the first message may include an indication of one or more modes of the full-duplex communication scheme supported by the UE 115.

In some cases, at 435, the network entity 435 may process the first message.

In some cases, at 440, the network entity 405 may transmit a second message (e.g., MSGB) of the two-step random access procedure (e.g., in response to the first message). In some cases, the second message may include an indication of the one or more modes of a full-duplex communications scheme supported by the network entity 405. For example, the network entity 405 may indicate the one or more modes of a full-duplex communications scheme supported by the network entity 405 via one or more reserved bits in the second message. In another example, the second message may include a RAPID and the network entity 405 may indicate the one or more modes of a full-duplex communications scheme supported by the network entity 405 via a value of the RAPID. That is, each mode of the one or more modes may be associated with one or more RAPIDs (e.g., values of the RAPID). In another example, the network entity may transmit a control message (e.g., DCI) scheduling the second message and the indication of the one or more modes of a full-duplex communications scheme supported by the network entity 405 may be included in one or more bits of the control message.

In some cases, at 445, the UE 415 may transmit a feedback message including an acknowledgment message or a negative acknowledgment message. Additionally, the UE 415 may communicate with the network entity 405 based on the random access procedure and the network entity 405 supporting the one or more modes associated with the full-duplex communication scheme.

In some cases, the one or more modes may include a non-overlapping sub-band full-duplex mode, a partially-overlapping sub-band full-duplex mode, a fully-overlapping sub-band full-duplex mode, or any combination thereof. For example, the network entity 405 may indicate, to the UE 415, that the network entity 405 supports the partially-overlapping sub-band full-duplex mode and the UE 415 may determine that the network entity 405 supports the non-overlapping sub-band full-duplex mode and the partially-overlapping sub-band full-duplex mode based on the network entity 405 supporting the partially-overlapping sub-band full-duplex mode. In another example, the network entity 405 may indicate, to the UE 415, that the network entity 405 supports the fully-overlapping sub-band full-duplex mode and the UE 415 may determine that the network entity 405 supports the non-overlapping sub-band full-duplex mode, the partially-overlapping sub-band full-duplex mode, and the fully-overlapping sub-band full-duplex mode based on the UE supporting the fully-overlapping sub-band full-duplex mode.

Figure 5:
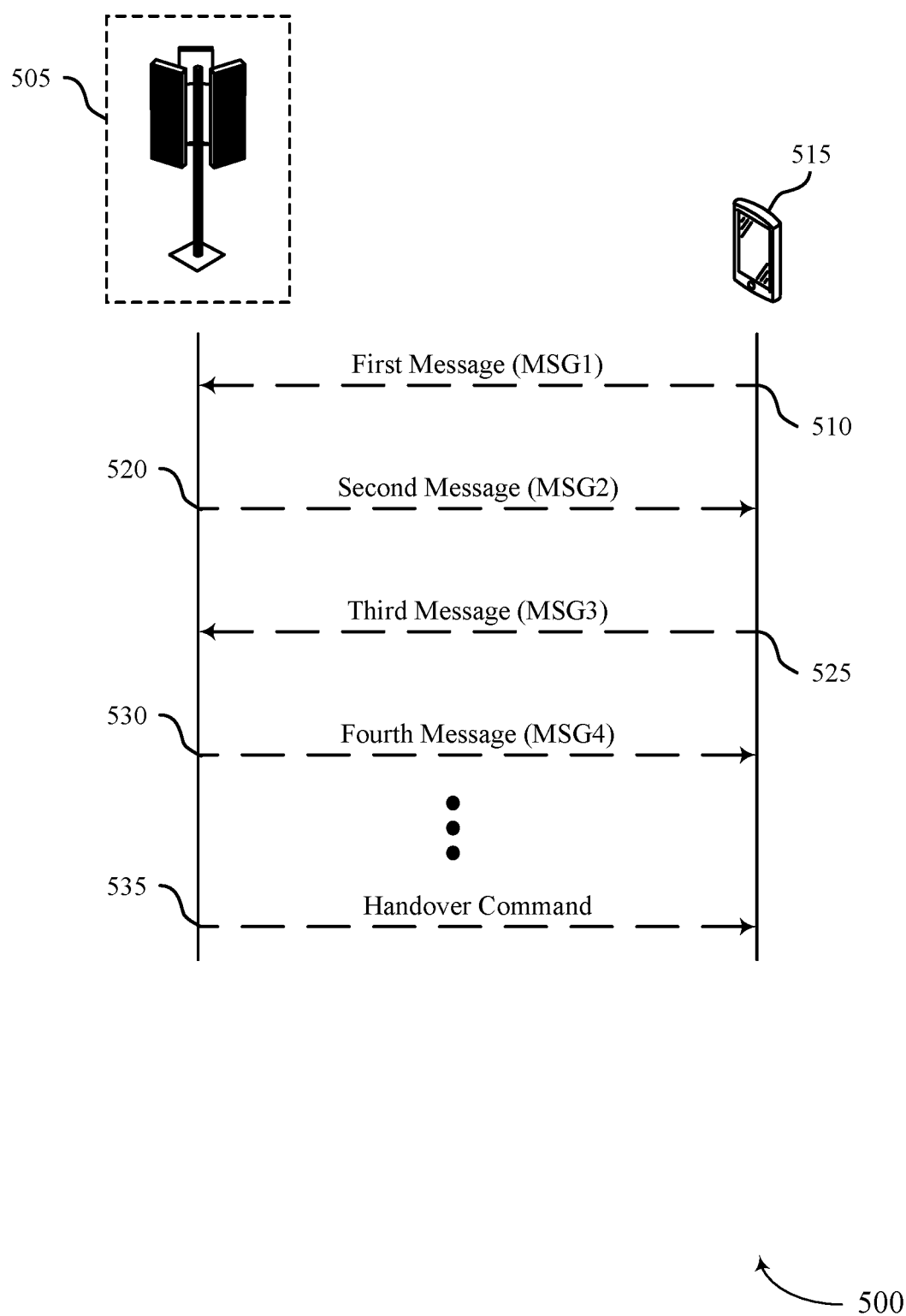

FIG. 5 illustrates an example of a process flow 500 in a system that supports a network indication of full-duplex capability in accordance with one or more aspects of the present disclosure In some examples, the process flow 500 may implement or be implemented by aspects of the wireless communications system 100, the wireless communications systems 200, the full-duplex communications schemes 300, and the process flow 500. For example, the process flow 500 may be implemented by a network entity 505 or a UE 515, which may be examples of the corresponding devices as described with reference to FIG. 1. In the example of FIG. 5, the network entity 505 may be an example of a CU 160, a DU 165, an RU 170, a base station 140, an IAB node 104, or one or more other network nodes as described with reference to FIG. 1. The process flow 500 may include techniques for the network entity 505 to provide an indication of full-duplex capability to the UE 515.

In some cases, at 510, the UE 515 may transmit a first message (e.g., MSG1) of a four-step random access procedure (e.g., 4-step RACH procedure), the first message including a random access request. In some cases, the first message may include an indication of one or more modes of the full-duplex communication scheme supported by the UE 115.

In some cases, at 520, the network entity 505 may transmit a second message (e.g., MSG2) of the four-step random access procedure. In some cases, the second message may include an indication of the one or more modes of a full-duplex communications scheme supported by the network entity 505. For example, the network entity 505 may indicate the one or more modes of a full-duplex communications scheme supported by the network entity 505 via one or more reserved bits in the second message. In another example, the second message may include a RAPID and the network entity 505 may indicate the one or more modes of a full-duplex communications scheme supported by the network entity 505 via a value of the RAPID. That is, each mode of the one or more modes may be associated with one or more RAPIDs (e.g., values of the RAPID). In another example, the network entity may transmit a control message (e.g., DCI) scheduling the second message and the indication of the one or more modes of a full-duplex communications scheme supported by the network entity 505 may be included in one or more bits of the control message.

In some cases, at 525, the UE 515 may transmit a third message (e.g., MSG3) of the four-step random access procedure. In some cases, the third message may include an indication of one or more modes of the full-duplex communication scheme supported by the UE 115.

In some cases, at 530, the network entity 505 may transmit a fourth message (e.g., MSG4) of the four-step random access procedure. In some cases, the fourth message may include an indication of the one or more modes of a full-duplex communications scheme supported by the network entity 505. For example, the network entity 505 may indicate the one or more modes of a full-duplex communications scheme supported by the network entity 505 via one or more reserved bits in the fourth message. In another example, the fourth message may include a RAPID and the network entity 505 may indicate the one or more modes of a full-duplex communications scheme supported by the network entity 505 via a value of the RAPID.

In some cases, at 535, the network entity 505 may transmit a handover command to the UE 515. For example, after the UE 515 and the network entity establish a connection (e.g., using a two-step random access procedure, using a four-step random access procedure), some communication link conditions may change (e.g., due to mobility of the UE 515, due to interference, among other reasons). In such cases, the UE 515 and the network entity 505 may complete a handover procedure based on a set of measurements, such that the UE 515 may connect to another cell (e.g., one or more target cells, one or more target network nodes). In some cases, the handover command may indicate that one or more other network entities supports one or more modes of a full-duplex communications scheme, which may inform the UE 515 of which network entities may support the one or more modes of the full-duplex communications scheme.

Figure 6:
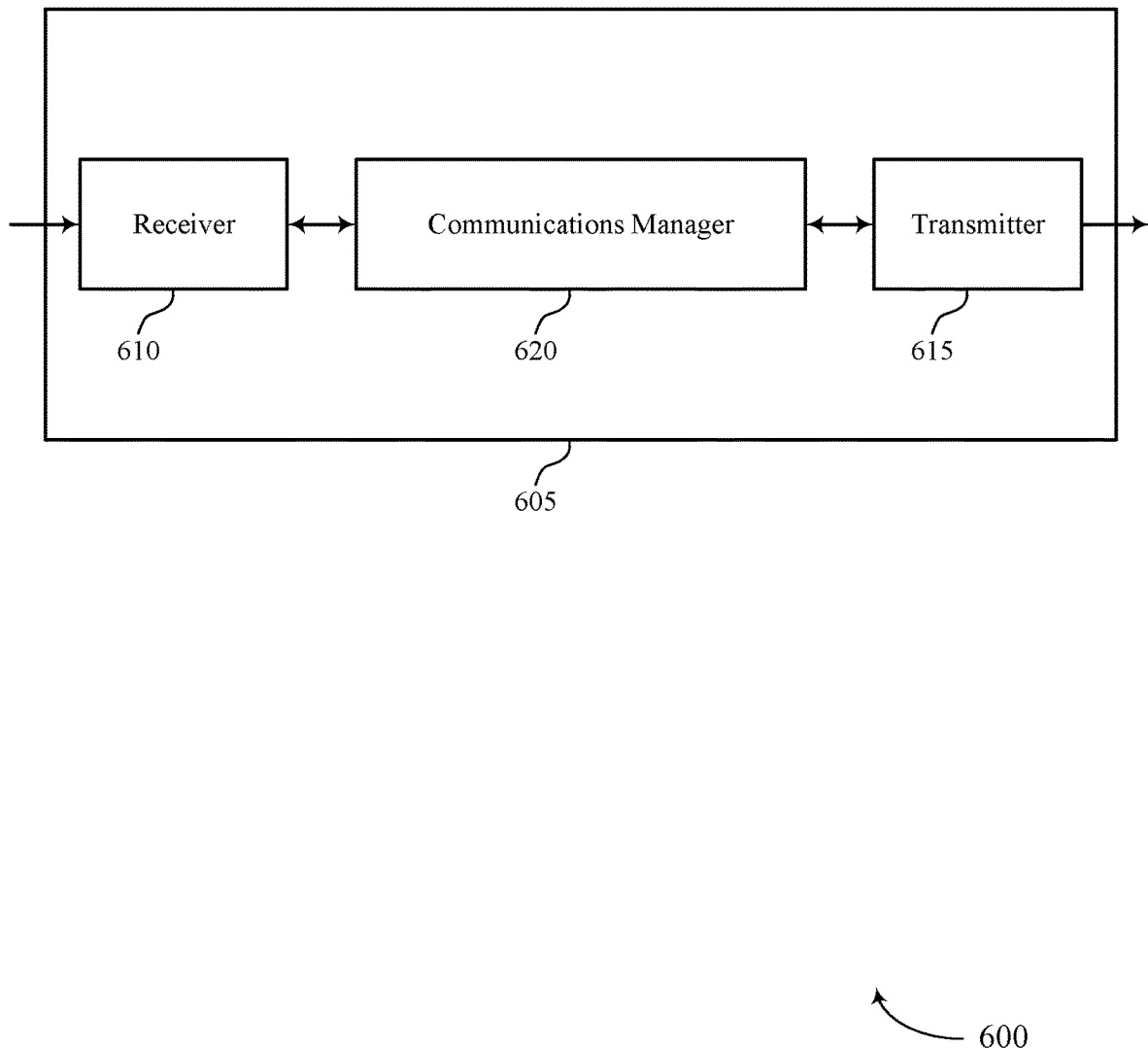
FIGS. 6 and 7 show block diagrams of devices that support a network indication of full-duplex capability in accordance with one or more aspects of the present disclosure.

FIG. 6 shows a block diagram 600 of a device 605 that supports a network indication of full-duplex capability in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to network indication of full-duplex capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network indication of full-duplex capability). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of network indication of full-duplex capability as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving, from a network entity, a capability message indicating that the network entity supports one or more modes of a full-duplex communications scheme, where the capability message is associated with an access procedure between the UE and the network entity. The communications manager 620 may be configured as or otherwise support a means for performing the access procedure with the network entity. The communications manager 620 may be configured as or otherwise support a means for communicating with the network entity based on the access procedure and the network entity supporting the one or more modes associated with the full-duplex communications scheme.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for network indication of full-duplex capability which may result in reduced processing, reduced power consumption, and more efficient utilization of communication resources, among other advantages.

Figure 7:
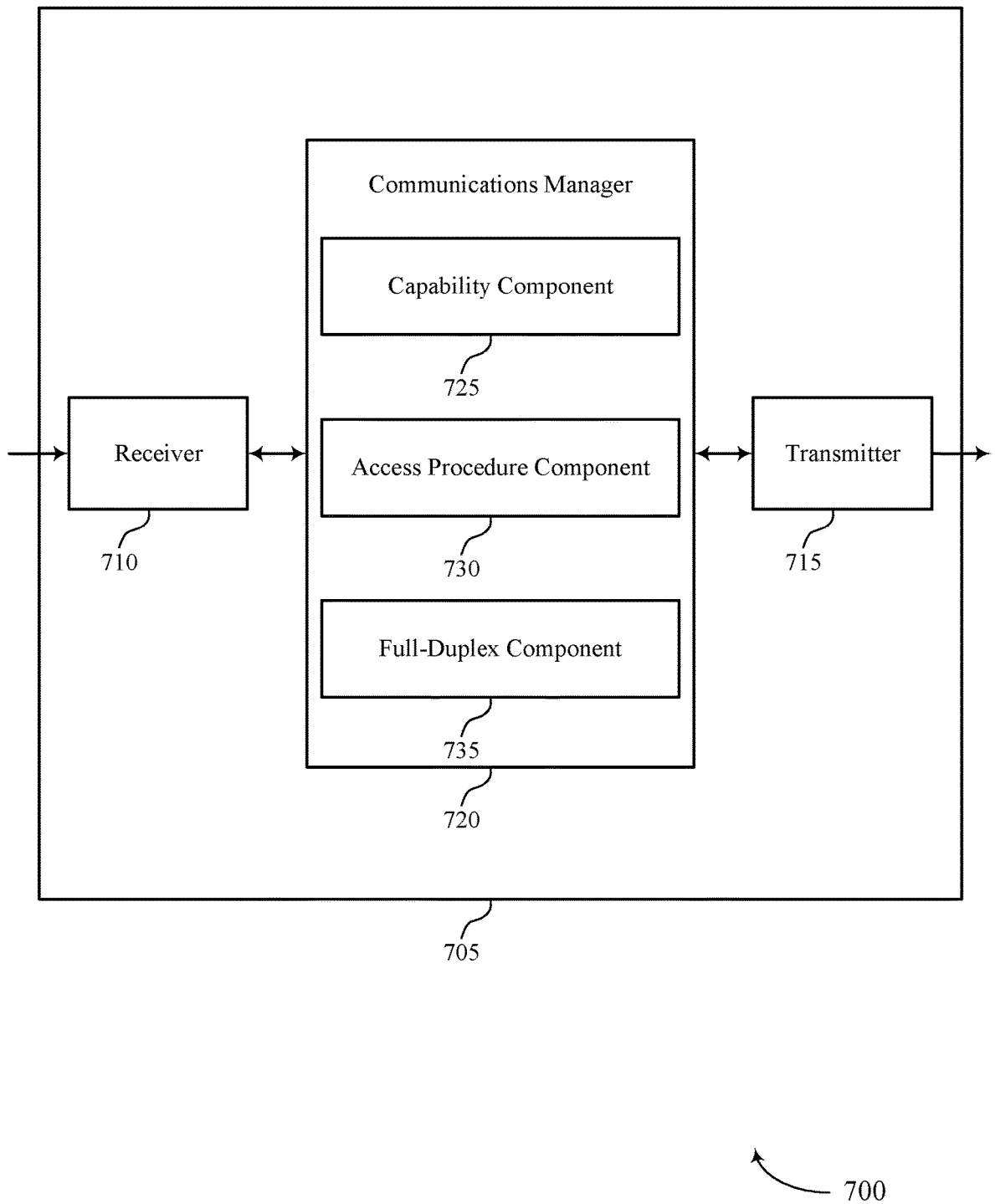

FIG. 7 shows a block diagram 700 of a device 705 that supports a network indication of full-duplex capability in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to network indication of full-duplex capability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to network indication of full-duplex capability). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of network indication of full-duplex capability as described herein. For example, the communications manager 720 may include a capability component 725, an access procedure component 730, a full-duplex component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The capability component 725 may be configured as or otherwise support a means for receiving, from a network entity, a capability message indicating that the network entity supports one or more modes of a full-duplex communications scheme, where the capability message is associated with an access procedure between the UE and the network entity. The access procedure component 730 may be configured as or otherwise support a means for performing the access procedure with the network entity. The full-duplex component 735 may be configured as or otherwise support a means for communicating with the network entity based on the access procedure and the network entity supporting the one or more modes associated with the full-duplex communications scheme.

Figure 8:
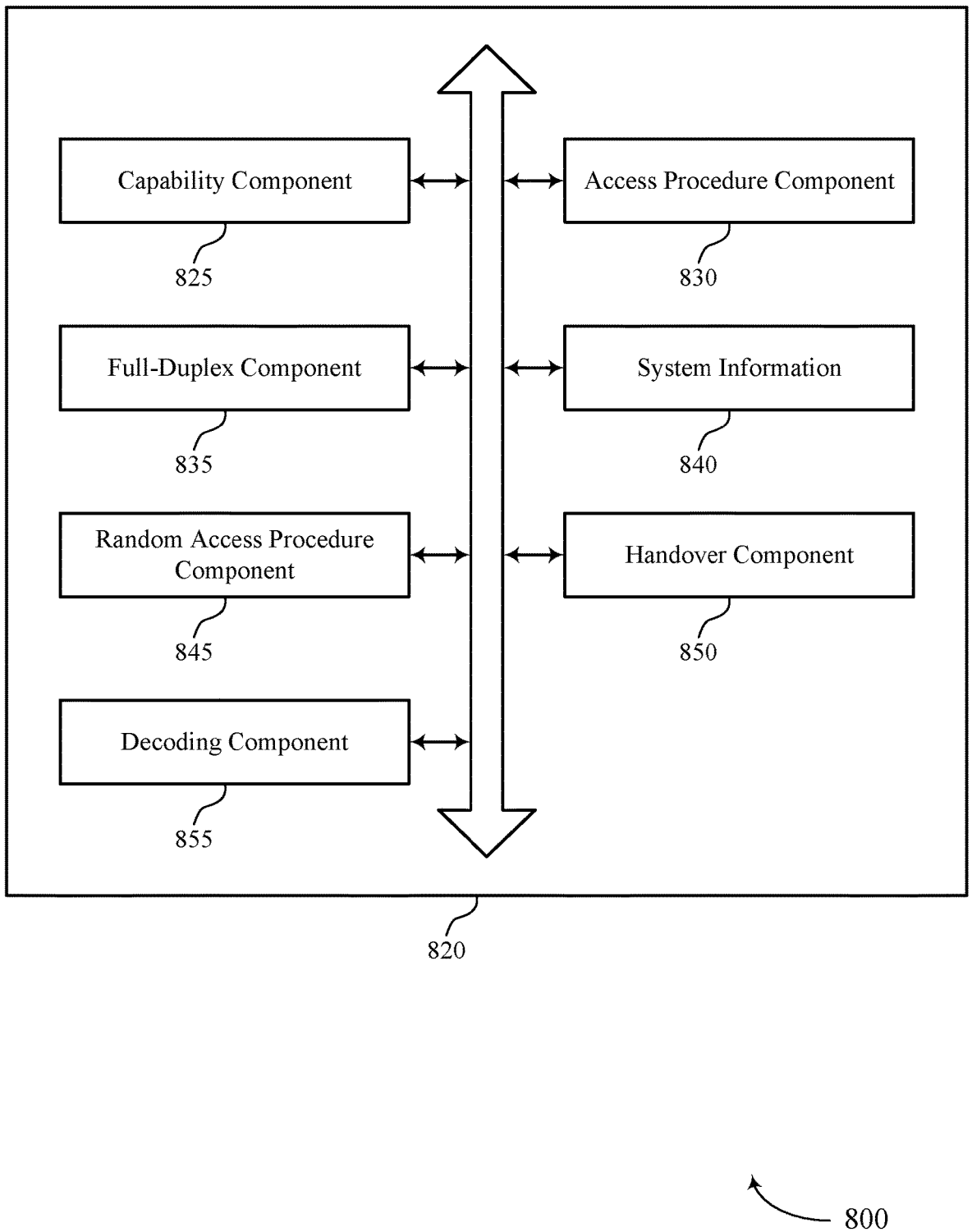
FIG. 8 shows a block diagram of a communications manager that supports a network indication of full-duplex capability in accordance with one or more aspects of the present disclosure.

FIG. 8 shows a block diagram 800 of a communications manager 820 that supports a network indication of full-duplex capability in accordance with one or more aspects of the present disclosure. The communications manager 820 may be an example of aspects of a communications manager 620, a communications manager 720, or both, as described herein. The communications manager 820, or various components thereof, may be an example of means for performing various aspects of network indication of full-duplex capability as described herein. For example, the communications manager 820 may include a capability component 825, an access procedure component 830, a full-duplex component 835, a system information 840, a random access procedure component 845, a handover component 850, a decoding component 855, or any combination thereof. Each of these components may communicate, directly or indirectly, with one another (e.g., via one or more buses).

The communications manager 820 may support wireless communications at a UE in accordance with examples as disclosed herein. The capability component 825 may be configured as or otherwise support a means for receiving, from a network entity, a capability message indicating that the network entity supports one or more modes of a full-duplex communications scheme, where the capability message is associated with an access procedure between the UE and the network entity. The access procedure component 830 may be configured as or otherwise support a means for performing the access procedure with the network entity. The full-duplex component 835 may be configured as or otherwise support a means for communicating with the network entity based on the access procedure and the network entity supporting the one or more modes associated with the full-duplex communications scheme.

In some examples, to support receiving the capability message, the system information 840 may be configured as or otherwise support a means for receiving a system information message indicating that the network entity supports the one or more modes of the full-duplex communications scheme, the capability message including the system information message.

In some examples, the system information message includes one or more bits indicating that the network entity supports the one or more modes of the full-duplex communications scheme.

In some examples, the decoding component 855 may be configured as or otherwise support a means for decoding the system information message, where one or more portions of system information is encoded with an indication that the network entity supports the one or more modes of the full-duplex communications scheme.

In some examples, the system information message indicates one or more parameters associated with a common serving cell configuration, the one or more parameters indicating that the network entity supports the one or more modes of the full-duplex communications scheme.

In some examples, the system information message includes one or more fields of a common uplink/downlink configuration, the one or more fields indicating that the network entity supports the one or more modes of the full-duplex communications scheme.

In some examples, the system information message includes an indication of an initial bandwidth part, the indication of the initial bandwidth part indicating that the network entity supports the one or more modes of the full-duplex communications scheme.

In some examples, the system information message includes one or more bits indicating that the network entity supports the one or more modes of the full-duplex communications scheme, the system information message associated with a SIB for cell reselection.

In some examples, the system information message includes a MIB or a SIB.

In some examples, to support receiving the capability message, the random access procedure component 845 may be configured as or otherwise support a means for receiving, as part of a random access procedure, a downlink message indicating that the network entity supports the one or more modes of the full-duplex communications scheme, where the capability message includes the downlink message and the access procedure includes the random access procedure.

In some examples, the downlink message includes one or more reserved bits indicating that the network entity supports the one or more modes of the full-duplex communications scheme.

In some examples, to support receiving the downlink message, the random access procedure component 845 may be configured as or otherwise support a means for transmitting, as part of the random access procedure, a first message including a random access request. In some examples, to support receiving the downlink message, the random access procedure component 845 may be configured as or otherwise support a means for receiving, in response to the random access request, the downlink message including a RAPID, where a value of the RAPID indicates that the network entity supports the one or more modes of the full-duplex communications scheme.

In some examples, each mode of the one or more modes is associated with one or more RAPIDs.

In some examples, to support receiving the capability message, the random access procedure component 845 may be configured as or otherwise support a means for receiving, as part of a random access procedure, a control message that schedules a downlink message associated with a random access procedure, where one or more bits of the control message indicate that the network entity supports the one or more modes of the full-duplex communications scheme, the control message including the capability message.

In some examples, to support receiving the capability message, the handover component 850 may be configured as or otherwise support a means for receiving a control message associated with a handover procedure, where the control message indicates that one or more other network entities support the one or more modes of the full-duplex communications scheme.

In some examples, the one or more modes include a non-overlapping sub-band full-duplex mode, a partially-overlapping sub-band full-duplex mode, a fully-overlapping sub-band full-duplex mode, or any combination thereof.

In some examples, the capability message indicates that the network entity supports the partially-overlapping sub-band full-duplex mode, and the capability component 825 may be configured as or otherwise support a means for determining that the network entity supports the non-overlapping sub-band full-duplex mode and the partially-overlapping sub-band full-duplex mode based on the network entity supporting the partially-overlapping sub-band full-duplex mode.

In some examples, the capability message indicates that the network entity supports the fully-overlapping sub-band full-duplex mode, and the capability component 825 may be configured as or otherwise support a means for determining that the network entity supports the non-overlapping sub-band full-duplex mode, the partially-overlapping sub-band full-duplex mode, and the fully-overlapping sub-band full-duplex mode based on the network entity supporting the fully-overlapping sub-band full-duplex mode.

In some examples, the capability component 825 may be configured as or otherwise support a means for transmitting a message indicating a capability of the UE to support the one or more modes associated with the full-duplex communications scheme, where the message is transmitted in response to the capability message.

Figure 9:
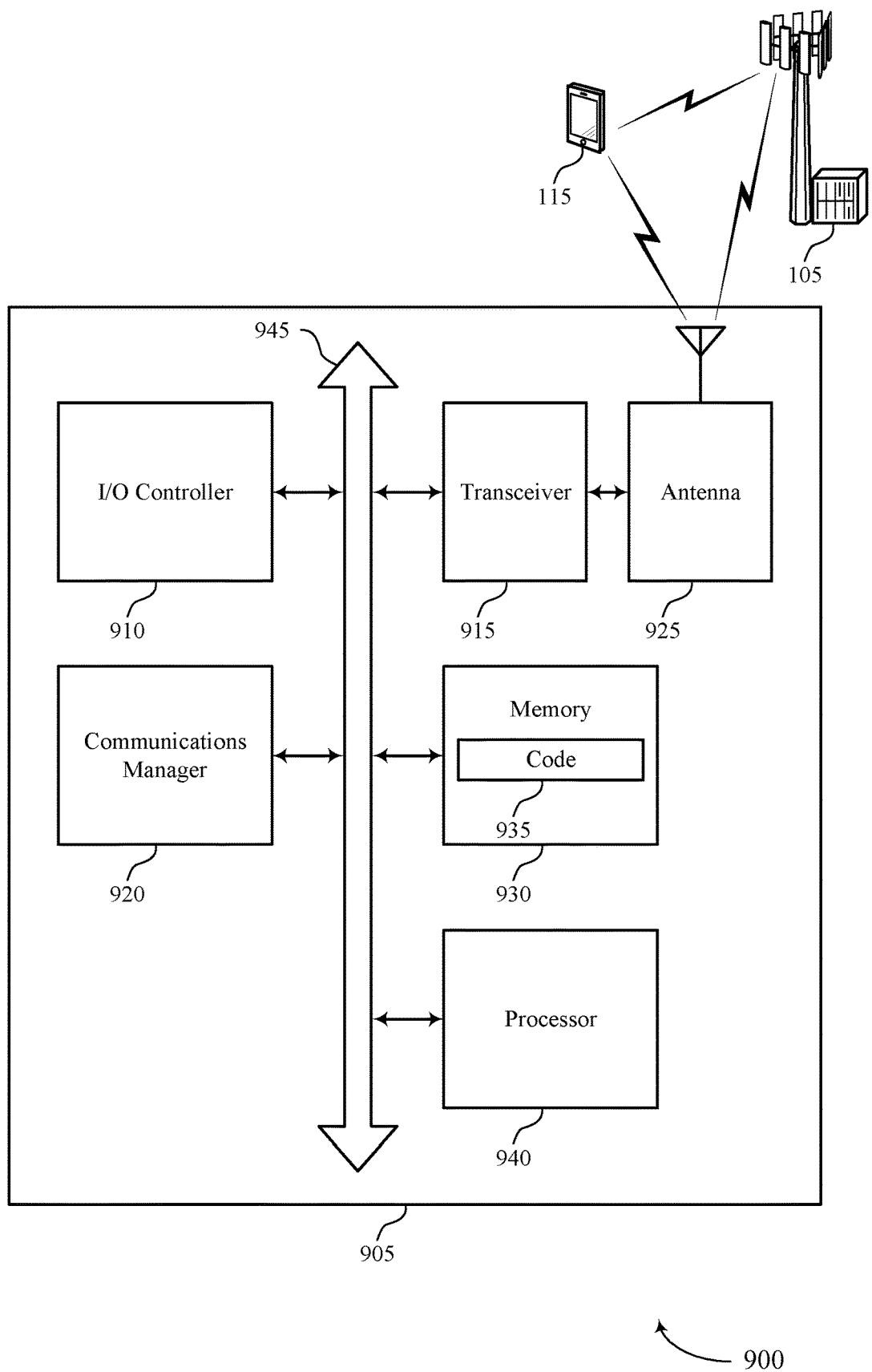
FIG. 9 shows a diagram of a system including a device that supports a network indication of full-duplex capability in accordance with one or more aspects of the present disclosure.

FIG. 9 shows a diagram of a system 900 including a device 905 that supports a network indication of full-duplex capability in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting network indication of full-duplex capability). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a network entity, a capability message indicating that the network entity supports one or more modes of a full-duplex communications scheme, where the capability message is associated with an access procedure between the UE and the network entity. The communications manager 920 may be configured as or otherwise support a means for performing the access procedure with the network entity. The communications manager 920 may be configured as or otherwise support a means for communicating with the network entity based on the access procedure and the network entity supporting the one or more modes associated with the full-duplex communications scheme.

By including or configuring the communications manager 920 in accordance with examples as described herein, the device 905 may support techniques for network indication of full-duplex capability which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of network indication of full-duplex capability as described herein, or the processor 940 and the memory 930 may be otherwise configured to perform or support such operations.

Figure 10:
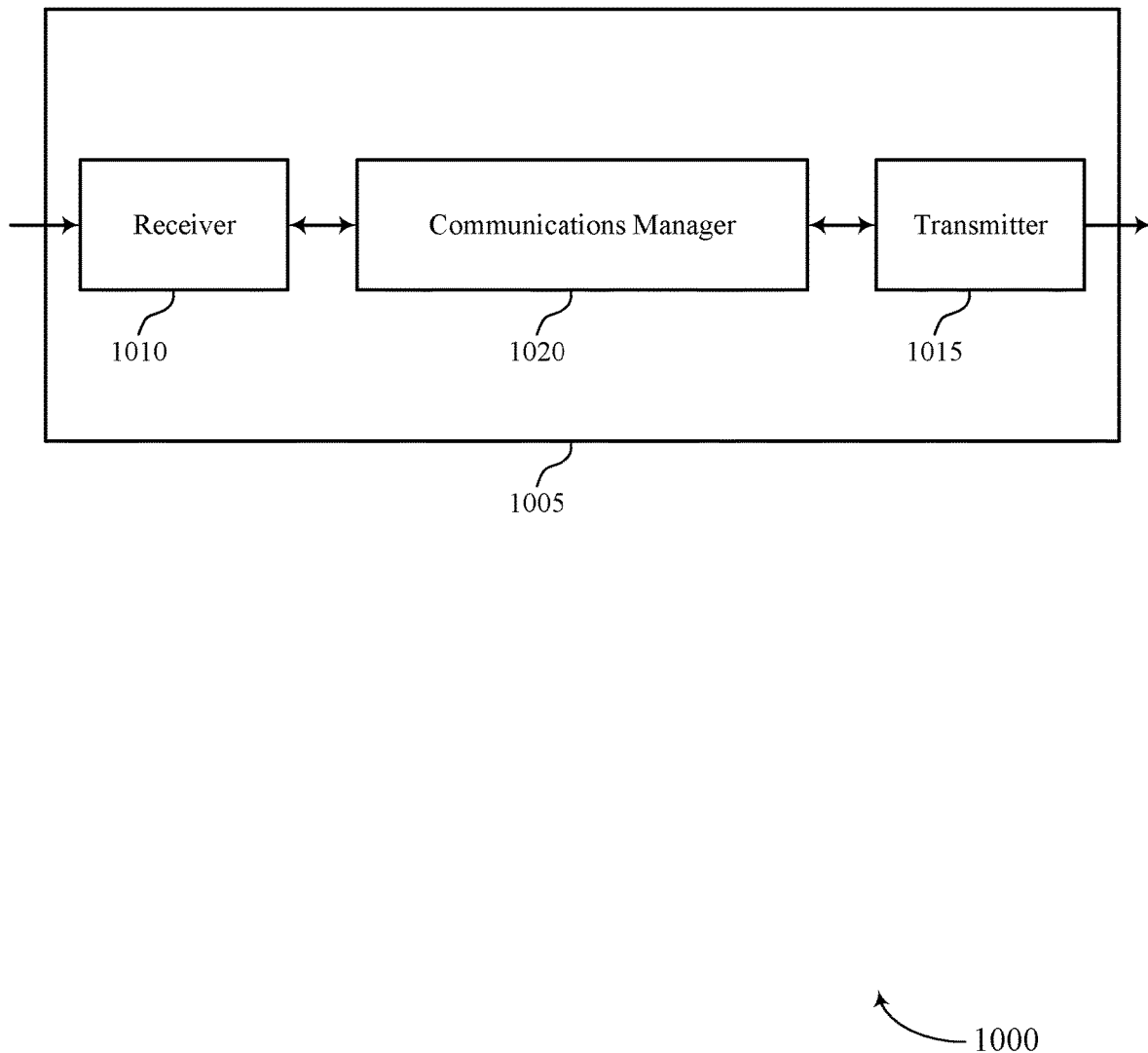
FIGS. 10 and 11 show block diagrams of devices that support a network indication of full-duplex capability in accordance with one or more aspects of the present disclosure.

FIG. 10 shows a block diagram 1000 of a device 1005 that supports a network indication of full-duplex capability in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of network indication of full-duplex capability as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting a capability message indicating that the network entity supports one or more modes of a full-duplex communications scheme, where the capability message is associated with an access procedure between the network entity and a UE. The communications manager 1020 may be configured as or otherwise support a means for performing the access procedure with the UE. The communications manager 1020 may be configured as or otherwise support a means for communicating with the UE based on the access procedure and the network entity supporting the one or more modes associated with the full-duplex communications scheme.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for network indication of full-duplex capability which may result in reduced processing, reduced power consumption, and more efficient utilization of communication resources, among other advantages.

Figure 11:
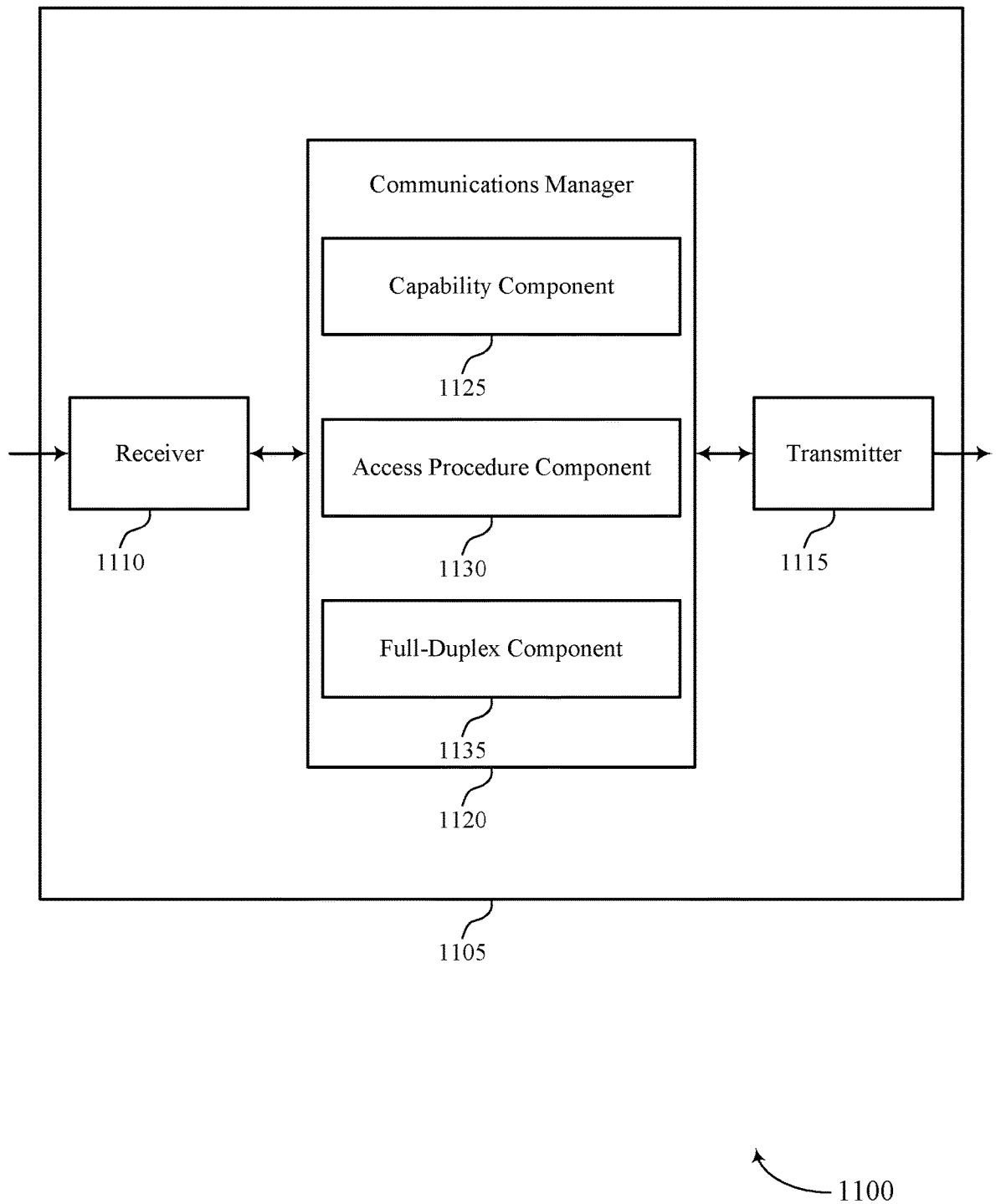

FIG. 11 shows a block diagram 1100 of a device 1105 that supports a network indication of full-duplex capability in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of network indication of full-duplex capability as described herein. For example, the communications manager 1120 may include a capability component 1125, an access procedure component 1130, a full-duplex component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The capability component 1125 may be configured as or otherwise support a means for transmitting a capability message indicating that the network entity supports one or more modes of a full-duplex communications scheme, where the capability message is associated with an access procedure between the network entity and a UE. The access procedure component 1130 may be configured as or otherwise support a means for performing the access procedure with the UE. The full-duplex component 1135 may be configured as or otherwise support a means for communicating with the UE based on the access procedure and the network entity supporting the one or more modes associated with the full-duplex communications scheme.

Figure 12:
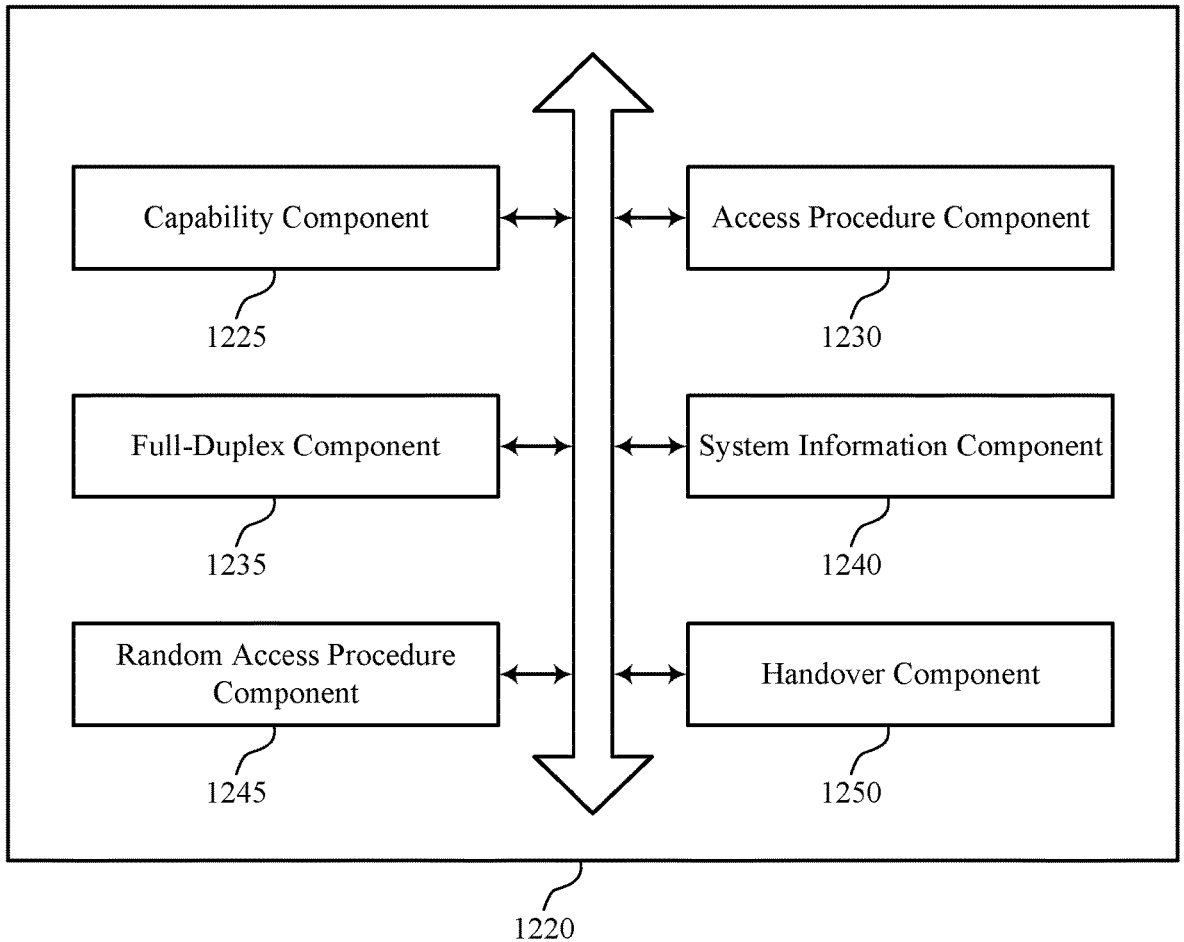
FIG. 12 shows a block diagram of a communications manager that supports a network indication of full-duplex capability in accordance with one or more aspects of the present disclosure.

FIG. 12 shows a block diagram 1200 of a communications manager 1220 that supports a network indication of full-duplex capability in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of network indication of full-duplex capability as described herein. For example, the communications manager 1220 may include a capability component 1225, an access procedure component 1230, a full-duplex component 1235, a system information component 1240, a random access procedure component 1245, a handover component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The capability component 1225 may be configured as or otherwise support a means for transmitting a capability message indicating that the network entity supports one or more modes of a full-duplex communications scheme, where the capability message is associated with an access procedure between the network entity and a UE. The access procedure component 1230 may be configured as or otherwise support a means for performing the access procedure with the UE. The full-duplex component 1235 may be configured as or otherwise support a means for communicating with the UE based on the access procedure and the network entity supporting the one or more modes associated with the full-duplex communications scheme.

In some examples, to support transmitting the capability message, the system information component 1240 may be configured as or otherwise support a means for broadcasting, to one or more UEs including the UE, a system information message indicating that the network entity supports the one or more modes of the full-duplex communications scheme, the capability message including the system information message.

In some examples, the system information message includes one or more bits indicating that the network entity supports the one or more modes of the full-duplex communications scheme.

In some examples, the system information component 1240 may be configured as or otherwise support a means for encoding one or more portions of system information with an indication that the network entity supports the one or more modes of the full-duplex communications scheme, where the system information message includes the one or more portions of the system information encoded with the indication.

In some examples, the system information message indicates one or more parameters associated with a common serving cell configuration, the one or more parameters indicating that the network entity supports the one or more modes of the full-duplex communications scheme.

In some examples, the system information message includes one or more fields of a common uplink/downlink configuration, the one or more fields indicating that the network entity supports the one or more modes of the full-duplex communications scheme.

In some examples, the system information message includes an indication of an initial bandwidth part, the indication of the initial bandwidth part indicating that the network entity supports the one or more modes of the full-duplex communications scheme.

In some examples, the system information message includes one or more bits indicating that the network entity supports the one or more modes of the full-duplex communications scheme, the system information message associated with a SIB for cell reselection.

In some examples, to support transmitting the capability message, the random access procedure component 1245 may be configured as or otherwise support a means for transmitting, as part of a random access procedure, a downlink message indicating that the network entity supports the one or more modes of the full-duplex communications scheme, where the capability message includes the downlink message and the access procedure includes the random access procedure.

In some examples, the downlink message includes one or more reserved bits indicating that the network entity supports the one or more modes of the full-duplex communications scheme.

In some examples, to support transmitting the downlink message, the random access procedure component 1245 may be configured as or otherwise support a means for receiving, as part of the random access procedure, a first message including a random access request. In some examples, to support transmitting the downlink message, the random access procedure component 1245 may be configured as or otherwise support a means for transmitting, in response to the random access request, the downlink message including a RAPID, where a value of the RAPID indicates that the network entity supports the one or more modes of the full-duplex communications scheme.

In some examples, each mode of the one or more modes is associated with one or more RAPIDs.

In some examples, to support transmitting the capability message, the random access procedure component 1245 may be configured as or otherwise support a means for transmitting, as part of a random access procedure, a control message that schedules a downlink message associated with the random access procedure, where one or more bits of the control message indicate that the network entity supports the one or more modes of the full-duplex communications scheme.

In some examples, to support transmitting the capability message, the handover component 1250 may be configured as or otherwise support a means for transmitting a control message associated with a handover procedure, where the control message indicates that one or more other network entities support the one or more modes of the full-duplex communications scheme.

In some examples, the one or more modes include a non-overlapping sub-band full-duplex mode, a partially-overlapping sub-band full-duplex mode, a fully-overlapping sub-band full-duplex mode, or any combination thereof.

In some examples, the capability component 1225 may be configured as or otherwise support a means for receiving a message indicating a capability of the UE to support the one or more modes associated with the full-duplex communications scheme, the one or more modes including a non-overlapping sub-band full-duplex mode, a partially-overlapping sub-band full-duplex mode, a fully-overlapping sub-band full-duplex mode, or any combination thereof, where the message is received in response to the capability message.

In some examples, the message indicates that the UE supports the partially-overlapping sub-band full-duplex mode, and the capability component 1225 may be configured as or otherwise support a means for determining that the UE supports the non-overlapping sub-band full-duplex mode and the partially-overlapping sub-band full-duplex mode based on the UE supporting the partially-overlapping sub-band full-duplex mode.

In some examples, the capability message indicates that the UE supports the fully-overlapping sub-band full-duplex mode, and the capability component 1225 may be configured as or otherwise support a means for determining that the UE supports the non-overlapping sub-band full-duplex mode, the partially-overlapping sub-band full-duplex mode, and the fully-overlapping sub-band full-duplex mode based on the UE supporting the fully-overlapping sub-band full-duplex mode.

Figure 13:
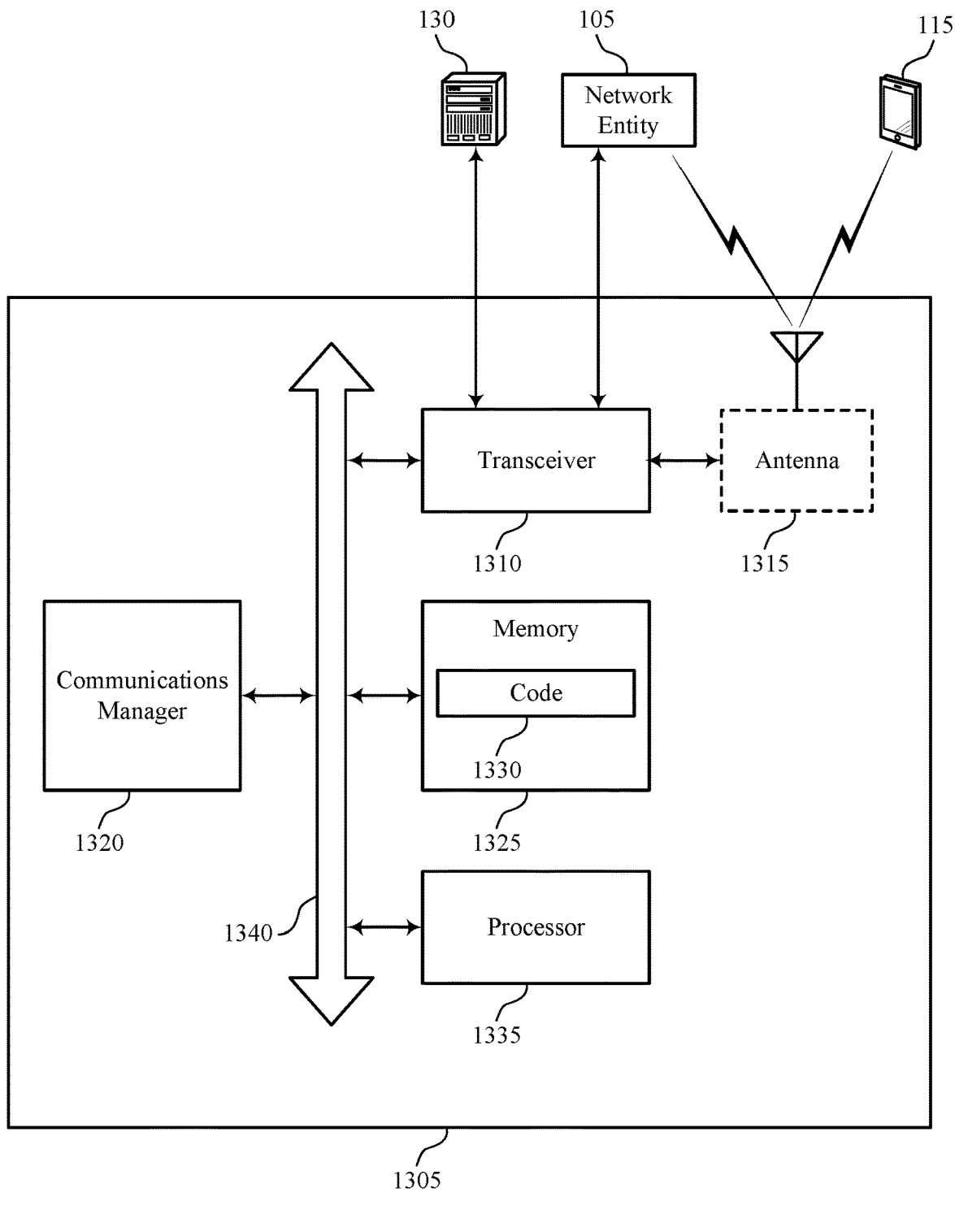
FIG. 13 shows a diagram of a system including a device that supports a network indication of full-duplex capability in accordance with one or more aspects of the present disclosure.

FIG. 13 shows a diagram of a system 1300 including a device 1305 that supports a network indication of full-duplex capability in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting network indication of full-duplex capability). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting a capability message indicating that the network entity supports one or more modes of a full-duplex communications scheme, where the capability message is associated with an access procedure between the network entity and a UE. The communications manager 1320 may be configured as or otherwise support a means for performing the access procedure with the UE. The communications manager 1320 may be configured as or otherwise support a means for communicating with the UE based on the access procedure and the network entity supporting the one or more modes associated with the full-duplex communications scheme.

By including or configuring the communications manager 1320 in accordance with examples as described herein, the device 1305 may support techniques for network indication of full-duplex capability which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of network indication of full-duplex capability as described herein, or the processor 1335 and the memory 1325 may be otherwise configured to perform or support such operations.

Figure 14:
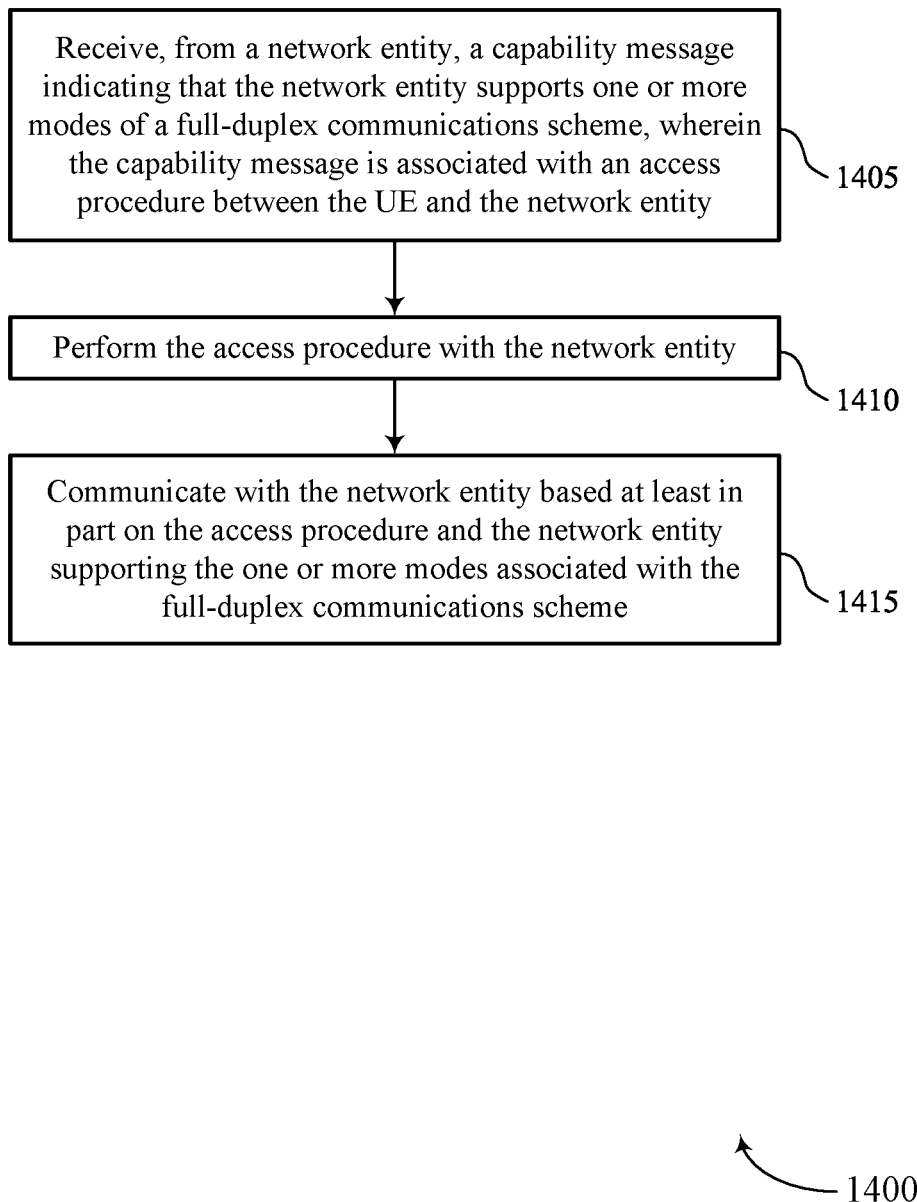
FIGS. 14 and 15 show flowcharts illustrating methods that support a network indication of full-duplex capability in accordance with one or more aspects of the present disclosure.

FIG. 14 shows a flowchart illustrating a method 1400 that supports a network indication of full-duplex capability in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a capability message indicating that the network entity supports one or more modes of a full-duplex communications scheme, where the capability message is associated with an access procedure between the UE and the network entity. The operations of 1405 may be performed in accordance with examples as disclosed herein. In some examples, aspects of the operations of 1405 may be performed by a capability component 825 as described with reference to FIG. 8.

At 1410, the method may include performing the access procedure with the network entity. The operations of 1410 may be performed in accordance with examples as disclosed herein. In some examples, aspects of the operations of 1410 may be performed by an access procedure component 830 as described with reference to FIG. 8.

At 1415, the method may include communicating with the network entity based on the access procedure and the network entity supporting the one or more modes associated with the full-duplex communications scheme. The operations of 1415 may be performed in accordance with examples as disclosed herein. In some examples, aspects of the operations of 1415 may be performed by a full-duplex component 835 as described with reference to FIG. 8.

Figure 15:
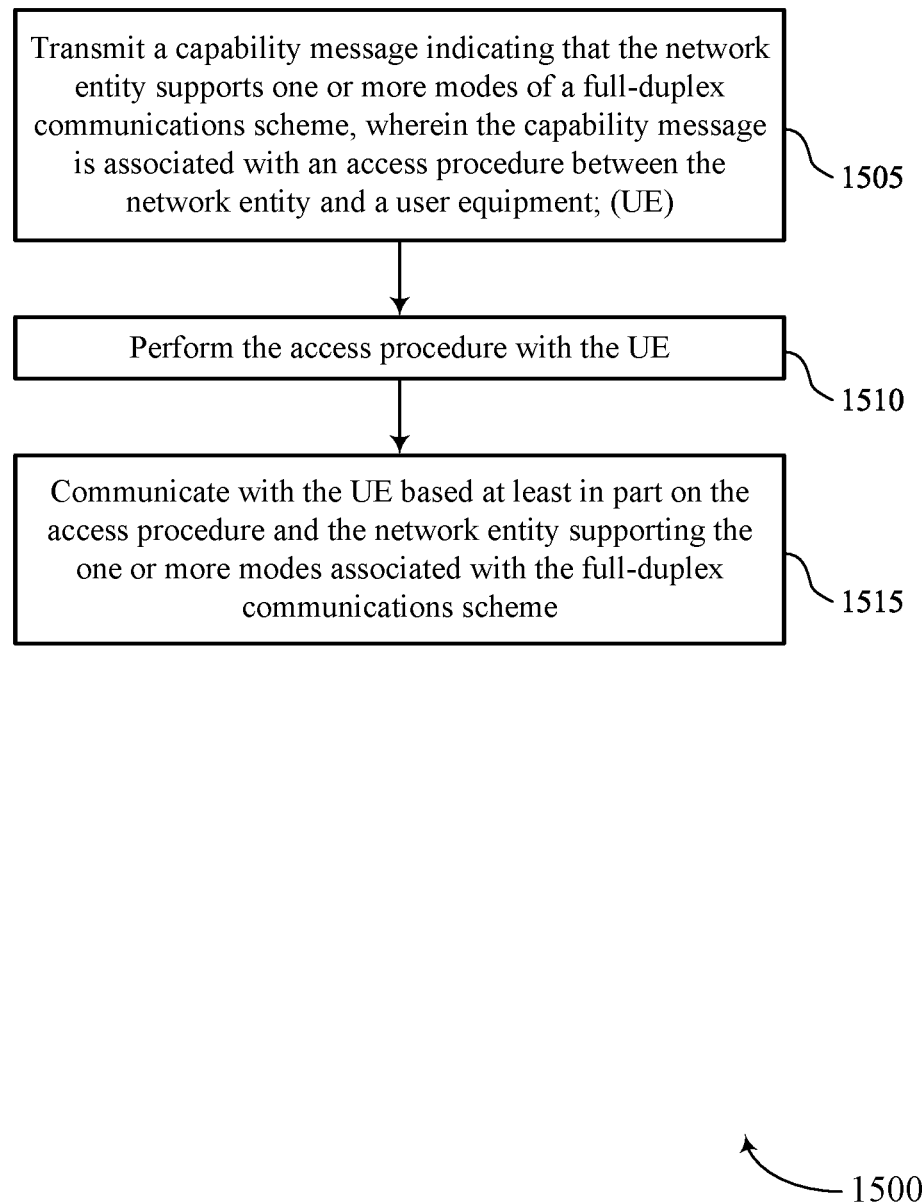

FIG. 15 shows a flowchart illustrating a method 1500 that supports a network indication of full-duplex capability in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a capability message indicating that the network entity supports one or more modes of a full-duplex communications scheme, where the capability message is associated with an access procedure between the network entity and a UE. The operations of 1505 may be performed in accordance with examples as disclosed herein. In some examples, aspects of the operations of 1505 may be performed by a capability component 1225 as described with reference to FIG. 12.

At 1510, the method may include performing the access procedure with the UE. The operations of 1510 may be performed in accordance with examples as disclosed herein. In some examples, aspects of the operations of 1510 may be performed by an access procedure component 1230 as described with reference to FIG. 12.

At 1515, the method may include communicating with the UE based on the access procedure and the network entity supporting the one or more modes associated with the full-duplex communications scheme. The operations of 1515 may be performed in accordance with examples as disclosed herein. In some examples, aspects of the operations of 1515 may be performed by a full-duplex component 1235 as described with reference to FIG. 12.

The following provides an overview of aspects of the present disclosure:

Aspect 1: A method for wireless communications at a UE, comprising: receiving, from a network entity, a capability message indicating that the network entity supports one or more modes of a full-duplex communications scheme, wherein the capability message is associated with an access procedure between the UE and the network entity; performing the access procedure with the network entity; and communicating with the network entity based at least in part on the access procedure and the network entity supporting the one or more modes associated with the full-duplex communications scheme.

Aspect 2: The method of aspect 1, wherein receiving the capability message comprises: receiving a system information message indicating that the network entity supports the one or more modes of the full-duplex communications scheme, the capability message comprising the system information message.

Aspect 3: The method of aspect 2, wherein the system information message includes one or more bits indicating that the network entity supports the one or more modes of the full-duplex communications scheme.

Aspect 4: The method of aspect 2, further comprising: decoding the system information message, wherein one or more portions of system information is encoded with an indication that the network entity supports the one or more modes of the full-duplex communications scheme.

Aspect 5: The method of aspect 2, wherein the system information message indicates one or more parameters associated with a common serving cell configuration, the one or more parameters indicating that the network entity supports the one or more modes of the full-duplex communications scheme.

Aspect 6: The method of aspect 2, wherein the system information message comprises one or more fields of a common uplink/downlink configuration, the one or more fields indicating that the network entity supports the one or more modes of the full-duplex communications scheme.

Aspect 7: The method of aspect 2, wherein the system information message comprises an indication of an initial bandwidth part, the indication of the initial bandwidth part indicating that the network entity supports the one or more modes of the full-duplex communications scheme.

Aspect 8: The method of aspect 2, wherein the system information message includes one or more bits indicating that the network entity supports the one or more modes of the full-duplex communications scheme, the system information message associated with a SIB for cell reselection.

Aspect 9: The method of any of aspects 2 through 8 wherein the system information message comprises a MIB or a SIB.

Aspect 10: The method of aspect 1, wherein receiving the capability message comprises: receiving, as part of a random access procedure, a downlink message indicating that the network entity supports the one or more modes of the full-duplex communications scheme, wherein the capability message comprises the downlink message and the access procedure comprises the random access procedure.

Aspect 11: The method of aspect 10, wherein the downlink message comprises one or more reserved bits indicating that the network entity supports the one or more modes of the full-duplex communications scheme.

Aspect 12: The method of any of aspects 10 through 11, wherein receiving the downlink message comprises: transmitting, as part of the random access procedure, a first message comprising a random access request; and receiving, in response to the random access request, the downlink message comprising a RAPID, wherein a value of the RAPID indicates that the network entity supports the one or more modes of the full-duplex communications scheme.

Aspect 13: The method of aspect 12, wherein each mode of the one or more modes is associated with one or more RAPIDs.

Aspect 14: The method of aspect 1, wherein receiving the capability message comprises: receiving, as part of a random access procedure, a control message that schedules a downlink message associated with a random access procedure, wherein one or more bits of the control message indicate that the network entity supports the one or more modes of the full-duplex communications scheme, the control message comprising the capability message.

Aspect 15: The method of any of aspects 1, wherein receiving the capability message comprises: receiving a control message associated with a handover procedure, wherein the control message indicates that one or more other network entities support the one or more modes of the full-duplex communications scheme.

Aspect 16: The method of any of aspects 1 through 15, wherein the one or more modes comprise a non-overlapping sub-band full-duplex mode, a partially-overlapping sub-band full-duplex mode, a fully-overlapping sub-band full-duplex mode, or any combination thereof.

Aspect 17: The method of aspect 16, wherein the capability message indicates that the network entity supports the partially-overlapping sub-band full-duplex mode, the method further comprising: determining that the network entity supports the non-overlapping sub-band full-duplex mode and the partially-overlapping sub-band full-duplex mode based at least in part on the network entity supporting the partially-overlapping sub-band full-duplex mode.

Aspect 18: The method of any of aspects 16 through 17, wherein the capability message indicates that the network entity supports the fully-overlapping sub-band full-duplex mode, the method further comprising: determining that the network entity supports the non-overlapping sub-band full-duplex mode, the partially-overlapping sub-band full-duplex mode, and the fully-overlapping sub-band full-duplex mode based at least in part on the network entity supporting the fully-overlapping sub-band full-duplex mode.

Aspect 19: The method of any of aspects 1 through 18, further comprising: transmitting a message indicating a capability of the UE to support the one or more modes associated with the full-duplex communications scheme, wherein the message is transmitted in response to the capability message.

Aspect 20: A method for wireless communications at a network entity, comprising: transmitting a capability message indicating that the network entity supports one or more modes of a full-duplex communications scheme, wherein the capability message is associated with an access procedure between the network entity and a UE; performing the access procedure with the UE; and communicating with the UE based at least in part on the access procedure and the network entity supporting the one or more modes associated with the full-duplex communications scheme.

Aspect 21: The method of aspect 20, wherein transmitting the capability message comprises: broadcasting, to one or more UEs including the UE, a system information message indicating that the network entity supports the one or more modes of the full-duplex communications scheme, the capability message comprising the system information message.

Aspect 22: The method of aspect 21, wherein the system information message includes one or more bits indicating that the network entity supports the one or more modes of the full-duplex communications scheme.

Aspect 23: The method of aspect 21, further comprising: encoding one or more portions of system information with an indication that the network entity supports the one or more modes of the full-duplex communications scheme, wherein the system information message comprises the one or more portions of the system information encoded with the indication.

Aspect 24: The method of aspect 21, wherein the system information message indicates one or more parameters associated with a common serving cell configuration, the one or more parameters indicating that the network entity supports the one or more modes of the full-duplex communications scheme.

Aspect 25: The method of aspect 21, wherein the system information message comprises one or more fields of a common uplink/downlink configuration, the one or more fields indicating that the network entity supports the one or more modes of the full-duplex communications scheme.

Aspect 26: The method of aspect 21, wherein the system information message comprises an indication of an initial bandwidth part, the indication of the initial bandwidth part indicating that the network entity supports the one or more modes of the full-duplex communications scheme.

Aspect 27: The method of aspect 21, wherein the system information message includes one or more bits indicating that the network entity supports the one or more modes of the full-duplex communications scheme, the system information message associated with a SIB for cell reselection.

Aspect 28: The method of aspect 20, wherein transmitting the capability message comprises: transmitting, as part of a random access procedure, a downlink message indicating that the network entity supports the one or more modes of the full-duplex communications scheme, wherein the capability message comprises the downlink message and the access procedure comprises the random access procedure.

Aspect 29: The method of aspect 28, wherein the downlink message comprises one or more reserved bits indicating that the network entity supports the one or more modes of the full-duplex communications scheme.

Aspect 30: The method of aspect 28, wherein transmitting the downlink message comprises: receiving, as part of the random access procedure, a first message comprising a random access request; and transmitting, in response to the random access request, the downlink message comprising a RAPID, wherein a value of the RAPID indicates that the network entity supports the one or more modes of the full-duplex communications scheme.

Aspect 31: The method of aspect 30, wherein each mode of the one or more modes is associated with one or more RAPIDs.

Aspect 32: The method of aspect 20, wherein transmitting the capability message comprises: transmitting, as part of a random access procedure, a control message that schedules a downlink message associated with the random access procedure, wherein one or more bits of the control message indicate that the network entity supports the one or more modes of the full-duplex communications scheme.

Aspect 33: The method of any of aspects 20, wherein transmitting the capability message comprises: transmitting a control message associated with a handover procedure, wherein the control message indicates that one or more other network entities support the one or more modes of the full-duplex communications scheme.

Aspect 34: The method of any of aspects 20 through 33, wherein the one or more modes include a non-overlapping sub-band full-duplex mode, a partially-overlapping sub-band full-duplex mode, a fully-overlapping sub-band full-duplex mode, or any combination thereof.

Aspect 35: The method of any of aspects 20 through 34, further comprising: receiving a message indicating a capability of the UE to support the one or more modes associated with the full-duplex communications scheme, the one or more modes comprising a non-overlapping sub-band full-duplex mode, a partially-overlapping sub-band full-duplex mode, a fully-overlapping sub-band full-duplex mode, or any combination thereof, wherein the message is received in response to the capability message.

Aspect 36: The method of aspect 35, wherein the message indicates that the UE supports the partially-overlapping sub-band full-duplex mode, the method further comprising: determining that the UE supports the non-overlapping sub-band full-duplex mode and the partially-overlapping sub-band full-duplex mode based at least in part on the UE supporting the partially-overlapping sub-band full-duplex mode.

Aspect 37: The method of any of aspects 35 through 36, wherein the capability message indicates that the UE supports the fully-overlapping sub-band full-duplex mode, the method further comprising: determining that the UE supports the non-overlapping sub-band full-duplex mode, the partially-overlapping sub-band full-duplex mode, and the fully-overlapping sub-band full-duplex mode based at least in part on the UE supporting the fully-overlapping sub-band full-duplex mode.

Aspect 38: An apparatus for wireless communications at a UE, comprising a processor; memory coupled with the processor; and instructions stored in the memory and executable by the processor to cause the apparatus to perform a method of any of aspects 1 through 19.

Aspect 39: An apparatus for wireless communications at a UE, comprising at least one means for performing a method of any of aspects 1 through 19.

Aspect 40: A non-transitory computer-readable medium storing code for wireless communications at a UE, the code comprising instructions executable by a processor to perform a method of any of aspects 1 through 19.

Aspect 41: An apparatus for wireless communications at a network entity, comprising a processor; memory coupled with the processor; and instructions stored in the memory and executable by the processor to cause the apparatus to perform a method of any of aspects 20 through 37.

Aspect 42: An apparatus for wireless communications at a network entity, comprising at least one means for performing a method of any of aspects 20 through 37.

Aspect 43: A non-transitory computer-readable medium storing code for wireless communications at a network entity, the code comprising instructions executable by a processor to perform a method of any of aspects 20 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, a capability message indicating that the network entity supports one or more full-duplex modes of a plurality of full-duplex modes associated with a full-duplex communications scheme, wherein the capability message is associated with an access procedure between the UE and the network entity, wherein the plurality of full-duplex modes comprises a non-overlapping sub-band full-duplex mode, a partially-overlapping sub-band full-duplex mode, and a fully-overlapping sub-band full-duplex mode;

performing the access procedure with the network entity; and communicating with the network entity based at least in part on the access procedure and the network entity supporting the one or more full-duplex modes associated with the full-duplex communications scheme, wherein the non-overlapping sub-band full-duplex mode is associated with a first capability to support one or more first uplink resources that are independent of one or more first downlink resources in a frequency domain, wherein the partially-overlapping sub-band full-duplex mode is associated with a second capability to support one or more second uplink resources that partially overlap with one or more second downlink resources in the frequency domain, and wherein the fully-overlapping sub-band full-duplex mode is associated with a third capability to support one third uplink resources that fully overlap with one or more third downlink resources in a time domain.

2. The method of claim 1, wherein receiving the capability message comprises:
receiving a system information message indicating that the network entity supports the one or more full-duplex modes of the plurality of full-duplex modes associated with the full-duplex communications scheme, the capability message comprising the system information message.

3. The method of claim 2, wherein the system information message includes one or more bits indicating that the network entity supports the one or more full-duplex modes of the plurality of full-duplex modes associated with the full-duplex communications scheme.

4. The method of claim 2, further comprising:
decoding the system information message, wherein one or more portions of system information is encoded with an indication that the network entity supports the one or more full-duplex modes of the plurality of full-duplex modes associated with the full-duplex communications scheme.

5. The method of claim 2, wherein the system information message indicates one or more parameters associated with a common serving cell configuration, the one or more parameters indicating that the network entity supports the one or more full-duplex modes of the plurality of full-duplex modes associated with the full-duplex communications scheme.

6. The method of claim 2, wherein the system information message comprises one or more fields of a common uplink/downlink configuration, the one or more fields indicating that the network entity supports the one or more full-duplex modes of the plurality of full-duplex modes associated with the full-duplex communications scheme.

7. The method of claim 2, wherein the system information message comprises an indication of an initial bandwidth part, the indication of the initial bandwidth part indicating that the network entity supports the one or more full-duplex modes of the plurality of full-duplex modes associated with the full-duplex communications scheme.

8. The method of claim 2, wherein the system information message includes one or more bits indicating that the network entity supports the one or more full-duplex modes of the plurality of full-duplex modes associated with the full-duplex communications scheme, the system information message associated with a system information block for cell reselection.

9. The method of claim 2, wherein the system information message comprises a master information block or a system information block.

10. The method of claim 1, wherein receiving the capability message comprises:
receiving, as part of a random access procedure, a downlink message indicating that the network entity supports the one or more full-duplex modes of the plurality of full-duplex modes associated with the full-duplex communications scheme, wherein the capability message comprises the downlink message and the access procedure comprises the random access procedure.

11. The method of claim 10, wherein the downlink message comprises one or more reserved bits indicating that the network entity supports the one or more full-duplex modes of the plurality of full-duplex modes associated with the full-duplex communications scheme.

12. The method of claim 10, wherein receiving the downlink message comprises:
transmitting, as part of the random access procedure, a first message comprising a random access request; and
receiving, in response to the random access request, the downlink message comprising a random access preamble identifier, wherein a value of the random access preamble identifier indicates that the network entity supports the one or more full-duplex modes of the plurality of full-duplex modes associated with the full-duplex communications scheme.

13. The method of claim 12, wherein each mode of the one or more full-duplex modes is associated with one or more random access preamble identifiers.

14. The method of claim 1, wherein receiving the capability message comprises:
receiving, as part of a random access procedure, a control message that schedules a downlink message associated with the random access procedure, wherein one or more bits of the control message indicate that the network entity supports the one or more full-duplex modes of the plurality of full-duplex modes associated with the full-duplex communications scheme, the control message comprising the capability message.

15. The method of claim 1, wherein receiving the capability message comprises:
receiving a control message associated with a handover procedure, wherein the control message indicates that one or more other network entities support the one or more full-duplex modes of the plurality of full-duplex modes associated with the full-duplex communications scheme.

16. The method of claim 1, wherein the capability message indicates that the network entity supports the partially-overlapping sub-band full-duplex mode, the method further comprising:
determining that the network entity supports the non-overlapping sub-band full-duplex mode and the partially-overlapping sub-band full-duplex mode based at least in part on the network entity supporting the partially-overlapping sub-band full-duplex mode.

17. The method of claim 1, wherein the capability message indicates that the network entity supports the fully-overlapping sub-band full-duplex mode, the method further comprising:
determining that the network entity supports the non-overlapping sub-band full-duplex mode, the partially-overlapping sub-band full-duplex mode, and the fully-overlapping sub-band full-duplex mode based at least in part on the network entity supporting the fully-overlapping sub-band full-duplex mode.

18. The method of claim 1, further comprising:
transmitting a message indicating a capability of the UE to support the one or more full-duplex modes of the plurality of full-duplex modes associated with the full-duplex communications scheme, wherein the message is transmitted in response to the capability message.

19. A method for wireless communications at a network entity, comprising:
transmitting a capability message indicating that the network entity supports one or more full-duplex modes of a plurality of full-duplex modes associated with a full-duplex communications scheme, wherein the capability message is associated with an access procedure between the network entity and a user equipment (UE), wherein the plurality of full-duplex modes comprises anon-overlapping sub-band full-duplex mode, a partially-overlapping sub-band full-duplex mode, and a fully-overlapping sub-band full-duplex mode;
performing the access procedure with the UE; and communicating with the UE based at least in part on the access procedure and the network entity supporting the one or more full-duplex modes associated with the full-duplex communications scheme, wherein the non-overlapping sub-band full-duplex mode is associated with a first capability to support one or more first uplink resources that are independent of one or more first downlink resources in a frequency domain, wherein the partially-overlapping sub-band full-duplex mode is associated with a second capability to support one or more second uplink resources that partially overlap with one or more second downlink resources in the frequency domain, and wherein the fully-overlapping sub-band full-duplex mode is associated with a third capability to support one third uplink resources that fully overlap with one or more third downlink resources in a time domain.

20. The method of claim 19, wherein transmitting the capability message comprises:

broadcasting, to one or more UEs including the UE, a system information message indicating that the network entity supports the one or more full-duplex modes of the plurality of full-duplex modes associated with the full-duplex communications scheme, the capability message comprising the system information message.

21. The method of claim 20, wherein the system information message indicates one or more parameters associated with a common serving cell configuration, the one or more parameters indicating that the network entity supports the one or more full-duplex modes of the plurality of full-duplex modes associated with the full-duplex communications scheme.

22. The method of claim 20, wherein the system information message comprises one or more fields of a common uplink/downlink configuration, the one or more fields indicating that the network entity supports the one or more full-duplex modes of the plurality of full-duplex modes associated with the full-duplex communications scheme.

23. The method of claim 20, wherein the system information message comprises an indication of an initial bandwidth part, the indication of the initial bandwidth part indicating that the network entity supports the one or more full-duplex modes of the plurality of full-duplex modes associated with the full-duplex communications scheme.

24. The method of claim 20, wherein the system information message includes one or more bits indicating that the network entity supports the one or more full-duplex modes of the plurality of full-duplex modes associated with the full-duplex communications scheme, the system information message associated with a system information block for cell reselection.

25. The method of claim 19, wherein transmitting the capability message comprises:

transmitting, as part of a random access procedure, a downlink message indicating that the network entity supports the one or more full-duplex modes of the plurality of full-duplex modes associated with the full-duplex communications scheme, wherein the capability message comprises the downlink message and the access procedure comprises the random access procedure.

26. The method of claim 19, wherein transmitting the capability message comprises:

transmitting, as part of a random access procedure, a control message that schedules a downlink message associated with the random access procedure, wherein one or more bits of the control message indicate that the network entity supports the one or more full-duplex modes of the plurality of full-duplex modes associated with the full-duplex communications scheme.

27. The method of claim 19, wherein transmitting the capability message comprises:

transmitting a control message associated with a handover procedure, wherein the control message indicates that one or more other network entities support the one or more full-duplex modes of the plurality of full-duplex modes associated with the full-duplex communications scheme.

28. An apparatus for wireless communications at a user equipment (UE), comprising:

a processor;

memory coupled with the processor; and instructions stored in the memory and executable by the processor to cause the apparatus to:

receive, from a network entity, a capability message indicating that the network entity supports one or more full-duplex modes of a plurality of full-duplex modes associated with a full-duplex communications scheme, wherein the capability message is associated with an access procedure between the UE and the network entity, wherein the plurality of full-duplex modes comprises anon-overlapping sub-band full-duplex mode, a partially-overlapping sub-band full-duplex mode, and a fully-overlapping sub-band full-duplex mode;

perform the access procedure with the network entity; and communicate with the network entity based at least in part on the access procedure and the network entity supporting the one or more full-duplex modes associated with the full-duplex communications scheme, wherein the non-overlapping sub-band full-duplex mode is associated with a first capability to support one or more first uplink resources that are independent of one or more first downlink resources in a frequency domain, wherein the partially-overlapping sub-band full-duplex mode is associated with a second capability to support one or more second uplink resources that partially overlap with one or more second downlink resources in the frequency domain, and wherein the fully-overlapping sub-band full-duplex mode is associated with a third capability to support one third uplink resources that fully overlap with one or more third downlink resources in a time domain.

29. An apparatus for wireless communications at a network entity, comprising:

a processor;

memory coupled with the processor; and instructions stored in the memory and executable by the processor to cause the apparatus to:

transmit a capability message indicating that the network entity supports one or more full-duplex modes of a plurality of full-duplex modes associated with a full-duplex communications scheme, wherein the capability message is associated with an access procedure between the network entity and a user equipment (UE), wherein the plurality of full-duplex modes comprises anon-overlapping sub-band full-duplex mode, a partially-overlapping sub-band full-duplex mode, and a fully-overlapping sub-band full-duplex mode;

perform the access procedure with the UE; and communicate with the UE based at least in part on the access procedure and the network entity supporting the one or more full-duplex modes associated with the full-duplex communications scheme, wherein the non-overlapping sub-band full-duplex mode is associated with a first capability to support one or more first uplink resources that are independent of one or more first downlink resources in a frequency domain, wherein the partially-overlapping sub-band full-duplex mode is associated with a second capability to support one or more second uplink resources that partially overlap with one or more second downlink resources in the frequency domain, and wherein the fully-overlapping sub-band full-duplex mode is associated with a third capability to support one third uplink resources that fully overlap with one or more third downlink resources in a time domain.

* * * * *